US012711797B2

(12) United States Patent
Balasubramaniyan et al.

(10) Patent No.: US 12,711,797 B2
(45) **Date of Patent: *Aug. 18, 2026**

(54) DATA DIGITIZATION VIA CUSTOM INTEGRATED MACHINE LEARNING ENSEMBLES

(71) Applicant: ADP, Inc., Roseland, NJ (US)

(72) Inventors: Rajarajeswari Balasubramaniyan, Dunwoody, GA (US); Yazan Abdel Majeed, Alpharetta, GA (US); Shivani Gajanan Arbat, Midvale, UT (US); Samhitha Balla, Alpharetta, GA (US); Jongsung Eo, Peachtree Corners, GA (US)

(73) Assignee: ADP, Inc., Roseland, NJ (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/355,198

(22) Filed: Jul. 19, 2023

(65) Prior Publication Data

US 2025/0029417 A1 Jan. 23, 2025

(51) Int. Cl.
*G06V 30/416* (2022.01)
*G06F 40/205* (2020.01)
*G06V 30/413* (2022.01)

(52) U.S. Cl.
CPC .......... *G06V 30/416* (2022.01); *G06F 40/205* (2020.01); *G06V 30/413* (2022.01)

(58) Field of Classification Search
CPC ... G06V 30/416; G06V 30/413; G06F 40/205
(Continued)

(56) References Cited

U.S. PATENT DOCUMENTS 7,315,867 B2 1/2008 Kobayashi et al.
7,640,185 B1 12/2009 Giordano et al.
(Continued)

FOREIGN PATENT DOCUMENTS

EP 3 798 956 A1 3/2021
WO WO-99/12109 A1 3/1999

OTHER PUBLICATIONS

NPL: Results Publication Date Range: Jul. 3, 2012 to Sep. 23, 2025.*
(Continued)

*Primary Examiner* — Quang N Vo
(74) *Attorney, Agent, or Firm* — Foley & Lardner LLP

(57) ABSTRACT

The present disclosure relates generally to the digitization of documents and more particularly, to a system, method and computer program which integrates multiple trained machine learning ensembles to identify, extract, and map a data set. The method, for example, includes receiving a data set from sources; identifying ensembles, each ensemble comprising machine learning models and each ensemble to determine an outcome; identifying a type for the data set based on a vendor type and the data set; executing a section detection module to identify sections of the data set and classify the sections; executing a page classification module; generating associations between the sections and the classifications; transforming, based on the association, the sections, the classifications, and the type, the data set into a second file type; and presenting the transformed data set for integration into a capital management system.

20 Claims, 10 Drawing Sheets

(58) Field of Classification Search
USPC .......................................................... 382/155
See application file for complete search history.

(56) References Cited

U.S. PATENT DOCUMENTS

| | | | | |
|---|---|---|---|---|
| 10,459,943 | B2 | 10/2019 | Hosur et al. | |
| 11,170,249 | B2 | 11/2021 | Semenov | |
| 11,669,779 | B2 * | 6/2023 | Lin | G06N 5/01 706/12 |
| 12,242,941 | B2 | 3/2025 | Brito et al. | |
| 12,299,551 | B2 | 5/2025 | Tuo et al. | |
| 12,326,872 | B2 | 6/2025 | Yazicioglu et al. | |
| 2008/0155249 | A1 | 6/2008 | Backof et al. | |
| 2012/0331131 | A1 | 12/2012 | Milden et al. | |
| 2014/0169665 | A1 | 6/2014 | Palm et al. | |
| 2016/0307067 | A1 | 10/2016 | Filimonova | |
| 2018/0373711 | A1 | 12/2018 | Ghatage et al. | |
| 2020/0175110 | A1 | 6/2020 | Snyder et al. | |
| 2020/0219111 | A1 | 7/2020 | Nair et al. | |
| 2021/0097274 | A1 | 4/2021 | Gligan et al. | |
| 2021/0103858 | A1 | 4/2021 | Padmanabhan et al. | |
| 2021/0150338 | A1 | 5/2021 | Semenov | |
| 2021/0312360 | A1 | 10/2021 | Kim et al. | |
| 2021/0357835 | A1 | 11/2021 | Modi et al. | |
| 2022/0139098 | A1 | 5/2022 | Semenov | |
| 2022/0237373 | A1 | 7/2022 | Singh Bawa et al. | |
| 2023/0028992 | A1 | 1/2023 | Zagaynov et al. | |
| 2023/0067069 | A1 | 3/2023 | Ghatage et al. | |
| 2023/0281510 | A1 * | 9/2023 | Royer | G06N 3/084 706/12 |
| 2025/0028734 | A1 * | 1/2025 | Balasubramaniyan | G06F 16/258 |
| 2025/0029417 | A1 | 1/2025 | Balasubramaniyan et al. | |

OTHER PUBLICATIONS

NPL: Results Publication Date Range: Jul. 3, 2012 to Oct. 30, 2025.*

"Kofax Capture Document Management System Demos Prescient", published Dec. 6, 2010, https://www.youtube.com/watch?v=M HcaiTZq RxM &list= PL0lif83klv61 VNfngSN9 R4ErfeOyd4L40&index=2.

Abbyy University: "Abbyy FlexiCapture Tutorial: NLP Models for Repeatable Items",(Feb. 7, 2022), XP093202628, https://www.youtube.com/watch?v=WO5zWtvILbc&list=PLiF4rjGylo5_HI-oevl4EOmYMRbZ8IMhg&index=2.

International Search Report issued in corresponding International Application No. PCT/US2024/038370, dated Sep. 17, 2024 (19 pages).

Kuncheva Ludmila I: "Chapter 6: ensemble methods" In: "Combining Pattern Classifiers", (2014), Wiley, XP093202668, pp. 186-229.

Prescientdm: "Kofax Capture Document Management Software Demos Prescient",(Dec. 6, 2010), XP093202624, https://www.youtube.com/watch?v=ebEjBJybPG8&list=PL0lif83klv61 VNfngSN9R4ErfeOyd4L40&index=2, 4 pages.

DMacks "Ensemble learning", Wikipedia, retrieved from the Internet:URL: https://en.wikipedia.org/w/index.phptitle=Ensemblelearning&0ldid=1160388140; Jun. 16, 2016, 15 pages.

International Search Report and Written Opinion issued in corresponding International Application No. PCT/US2024/038366, dated Nov. 15, 2024 (21 pages).

Sebastian Raschka, "Model Evaluation,Model Selection, and Algorithm Selection in Machine Learning", Retrieved from the Internet: URL:https://arxiv.org/pd?/1811.12808, Nov. 1, 2018, 49 pages.

Sundqvist et al., "Boosted Ensemble Learning for Anomaly Detection in 5G RAN", Artificial Intelligence Applications and Innovations: 16th IFIP WG 12.5 International Conference, AIAI 2020, Jun. 5-7, 2020, Proceedings, Part I, Jan. 1, 2020, Springer International Publishing, vol. 583, pp. 15-30, DOL: 10.1007/978-3-030-49161-12, Retrieved from the Internet: URL: https://link.springer.com/content/pdf/10.1007/978-3-030-49161-1 2.pdf?pdf=inline%201link>, 16 pages.

US Office Action issued in corresponding US Application No. 18/355, 186, dated Jun. 17, 2025 (11 pages).

Webb et al., "To Ensemble or Not Ensemble: When does End-to-End Training Fail", Machine Learning and Knowledge Discovery in Databases: European Conference, ECML PKDD 2020, Sep. 14-18, 2020, Proceedings, Part III, Aug. 6, 2020 (Aug. 6, 2020), Springer International Publishing, XP093216728, vol. 12459, pp. 109-123, DOL: 10.1007/978-3-030-67664-37, Retrieved from the Internet: URL: https://arxiv.org/pd?/1902.04422>, 21 pages.

Notice of Allowance on U.S. Appl. No. 18/355,186 DTD Nov. 4, 2025.

Final Rejection issued in corresponding U.S. Appl. No. 18/760,572, dated Jan. 13, 2026 (12 pages).

International Preliminary Report on Patentability and Written Opinion in corresponding International Application No. PCT/US2024/036420, dated Jan. 22, 2026 (7 pages).

International Preliminary Report on Patentability and Written Opinion in corresponding International Application No. PCT/US2024/038366, dated Jan. 29, 2026 (12 pages).

International Preliminary Report on Patentability and Written Opinion in corresponding International Application No. PCT/US2024/038370, dated Jan. 29, 2026 (11 pages).

International Search Report issued in corresponding International Application No. PCT/US2024/036420, dated Sep. 18, 2024 (13 pages).

US Office Action issued in corresponding U.S. Appl. No. 18/760,572, dated Jul. 24, 2025 (16 pages).

Windmill: "Kofax—Invoice Processing", (Jun. 12, 2014), XP093202623, https://www.youtube.com/watch? V=MHcaiTZqRxM &list=PLOlif83klv61 VNfngSN9OR4ErfeOyd4L40&index=2.

Notice of Allowance on U.S. Appl. No. 18/760,572 dated Jul. 1, 2026 (13 pages).

* cited by examiner

700

ABC LLC

PAYROLL JOURNAL

| EMPLOYEE NAME ID | HOURS, EARNINGS, REIMBURSEMENTS & OTHER PAYMENTS — DESCRIPTION | RATE | HOURS | EARNINGS | REIMB & OTHER PAYMENTS | WITHHOLDINGS | | DEDUCTIONS | | NET PAY ALLOCATIONS | |
|---|---|---|---|---|---|---|---|---|---|---|---|
| ****** 1 CORPORATE** | Salary | | | 560.00 | | Social Security | 34.72 | | | Direct Deposit # 17415 | |
| | | | | | | Medicare | 8.12 | | | **Check Amt** | 0.00 |
| | | | | | | Fed Income Tax | 33.36 | | | Chkg 505 | 483.80 |
| | EMPLOYEE TOTAL | | | 560.00 | | | 76.20 | | | Net Pay | 483.80 |
| **ExampleA_First Last 1234** | Salary | | | 600.00 | | Social Security | 37.20 | | | Direct Deposit # 17416 | |
| | | | | | | Medicare | 8.70 | | | **Check Amt** | 0.00 |
| | | | | | | Fed Income Tax | 38.16 | | | Chkg 285 | 515.94 |
| | EMPLOYEE TOTAL | | | 600.00 | | | 84.06 | | | Net Pay | 515.94 |
| **ExampleB_First Last 2345** | Hourly | 14.0000 | 15.35 | 214.90 | | Social Security | 13.32 | | | Direct Deposit # 17417 | |
| | | | | | | Medicare | 3.12 | | | **Check Amt** | 0.00 |
| | | | | | | | | | | Chkg 260 | 198.46 |
| | EMPLOYEE TOTAL | | 15.35 | 214.90 | | | 16.44 | | | Net Pay | 198.46 |
| **ExampleC_First Last 3456** | Salary | | | 600.00 | | | | | | Direct Deposit # 17418 | |
| | | | | | | | | | | **Check Amt** | 0.00 |
| | | | | | | | | | | Chkg 400 | 600.00 |
| | EMPLOYEE TOTAL | | | 600.00 | | | | | | Net Pay | 600.00 |
| **ExampleD_First Last 4567** | Salary | | | 1,442.31 | | Social Security | 85.58 | PX401 EEPRE | 144.23 | Direct Deposit # 17419 | |
| | | | | | | Medicare | 20.02 | PXUME EE PRE | 61.96 | **Check Amt** | 0.00 |
| | | | | | | Fed Income Tax | 110.43 | | | Chkg 423 | 1,020.09 |
| | EMPLOYEE TOTAL | | | 1,442.31 | | | 216.03 | | 206.19 | Net Pay | 1,020.09 |
| **ExampleE_First Last 5678** | Salary | | | 2,884.62 | | Social Security | 178.85 | PX401 EEPRE | 288.46 | Direct Deposit # 17420 | |
| | | | | | | Medicare | 41.83 | | | **Check Amt** | 0.00 |
| | | | | | | Fed Income Tax | 367.84 | | | Chkg 423 | 2,007.64 |
| | EMPLOYEE TOTAL | | | 2,884.62 | | | 588.52 | | 288.46 | Net Pay | 2,007.64 |
| **ExampleF_First Last 6789** | Hourly | 15.0000 | 27.92 | 418.80 | | Social Security | 25.97 | | | Direct Deposit # 17421 | |
| | | | | | | Medicare | 6.07 | | | **Check Amt** | 0.00 |
| | | | | | | Fed Income Tax | 16.98 | | | Chkg 910 | 369.78 |
| | EMPLOYEE TOTAL | | 27.92 | 418.80 | | | 49.02 | | | Net Pay | 369.78 |
| **ExampleG_First Last 7891** | Hourly | 15.0000 | 40.00 | 600.00 | | Social Security | 41.82 | | | Direct Deposit # 17422 | |
| | Overtime | 22.5000 | 3.31 | 74.48 | | Medicare | 9.78 | | | **Check Amt** | 0.00 |
| | | | | | | Fed Income Tax | 47.10 | | | Chkg 979 | 575.78 |
| | EMPLOYEE TOTAL | | 43.31 | 674.48 | | | 98.70 | | | Net Pay | 575.78 |
| **1 CORPORATE TOTALS** | | | | | | | | | | | |
| *8 Person(s)* | Hourly | | 83.27 | 1,233.70 | | Social Security | 417.46 | PX401 EEPRE | 432.69 | **Check Amt** | 0.00 |
| *8 Transaction(s)* | Salary | | | 6,086.93 | | Medicare | 97.64 | PXUME EE PRE | 61.96 | Dir Dep | 5,771.49 |
| | Overtime | | 3.31 | 74.48 | | Fed Income Tax | 613.87 | | | | |

Run Date 08/24/50 12:39 PM Period Start - End Date 08/13/50 - 08/19/50 Check Date 08/26/50

FIG. 7

DATA DIGITIZATION VIA CUSTOM INTEGRATED MACHINE LEARNING ENSEMBLES

BACKGROUND

Heterogeneous computing systems can process different types of data in different formats. However, due to the large volume of data files and scale of the heterogenous computing systems, it can be challenging to integrate a computing system with a centralized processing infrastructure without excessive data transformations, read/write database calls, or generating erroneous computing actions.

SUMMARY

This technical solution is directed to data digitization via custom integrated machine learning ensembles. For example, the technology can digitize documents using multiple integrated trained machine learning ensembles to identify, extract, and map a data set.

This disclosure is generally directed to digitizing a data set in a first type according to a plurality of machine learning ensembles to conform to a second type. For example, this technology can receive a data set in a first type and can filter, extract, and map the data set into a second type according to the contents of the data set and the outcomes of several ensembles of machine learning models. Data sets can be received by a server in a variety of formats from a variety of sources. Sometimes, multiple data sets in various types and from various sources can need to be formatted into one type for use in another application or device. Formatting these data sets to conform to a type usable by the application can be tedious due to the size of the data sets, variety of types, and intricacies of the data sets. This formatting can use large amounts of computational resources as well as be prone to error. Furthermore, this method of formatting is not easily extensible to new types of data sets.

Systems and methods of this technical solution can use trained ensembles of machine learning models to identify, extract, and map data of a data set to a type compatible with an electronic transaction system. The system can include a multitude of ensembles, each ensemble containing one or more machine learning models. The system can receive a data set incompatible with the electronic transfer system. The data set can be incompatible because of its file type, arrangement of the values within the data set, or extraneous values. The system can identify different types of the data set, such as a data type, vendor type, or file type, among others and can filter or remove subsets of the data set according to one or more of the ensembles. For example, the system can delete blank sheets or columns of the data set, or remove extraneous or junk information (e.g., irrelevant data) from the data set. The system can extract, using one or more of the ensembles, parameters of the data set such as a report type, sections, or page classifications, among others. The system can utilize the identified types and parameters to map the data set from a first type to a second type for use in the electronic transaction system. For example, the system can receive a data set from a first vendor, in a first format, and in a first file type, such as a Portable Document Format (PDF) file and can utilize the multitude of ensembles to ultimately map the data set into a standard type digestible by the electronic transfer system. Thus, by using a multitude of trained ensembles, the system can map various data sets in different types to a type compatible with the electronic transaction system, thereby reducing computational resources, onboarding time, and errors.

At least one aspect is directed to a system. The system can include one or more processors, coupled with memory. The system can receive a data set including sheets in a first file type from a set of sources. The data set can be in one of a set of formats corresponding to one or more of the set of sources. The system can identify a set of ensembles, each ensemble of the set of ensembles including one or more machine learning models and each ensemble to determine an outcome based on an outcome of each machine learning model of each respective ensemble. The system can identify, using a first ensemble of the set of ensembles, a type for each sheet of the data set based on a vendor type and the data set. The system can execute, using a second ensemble of the set of ensembles, a section detection module to identify sections for each sheet of the data set based on the respective type for each sheet and images and text within each sheet. The system can execute, using a third ensemble of the set of ensembles, a page classification module to identify classifications within each sheet based on the data set. The system can generate an association between the sections and the classifications for each type of each sheet of the data set. The system can transform, using a fourth ensemble of the set of ensembles based on the association, the sections, the classifications, and the type, the data set into a format of a second file type different from the set of formats. The system can provide, for render by a display device coupled with the one or more processors, the transformed data set for integration into an electronic transaction system.

In some embodiments, the system can receive a second data set including a first subset of data to be an input into the one or more machine learning models and a second subset of data to compare against an output of the one or more machine learning models. The system can generate, using the first subset of data, the set of ensembles. Each ensemble of the set of ensembles can include a subset of the one or more machine learning models and each ensemble can be generated sequentially. The system can determine, using the second subset of data, that the output of the one or more machine learning models is below a threshold error. In some embodiments, the system can determine than an error of one or more ensembles of the set of ensembles is greater than or equal to a threshold error. The system can aggregate a second data set including a first subset of data to be an input into the one or more machine learning models and a second subset of data to compare against an output of the one or more machine learning models. The system can generate, using the first subset of data, a second set of ensembles for each ensemble of the set of ensembles with its error greater than or equal to the threshold error. Each ensemble of the second set of ensembles can include a subset of the one or more machine learning models. The system can determine, using the second subset of data, that each machine learning model of each ensemble of the second set of ensembles is below the threshold error. The system can replace the set of ensembles with the second set of ensembles for each ensemble of the set of ensembles determined to have its error greater than or equal to the threshold error.

In some embodiments, the system can validate, using a fifth ensemble of the set of ensembles responsive to executing the section detection module, a label for each of the sections by comparing the text of the respective sheet to the label of the respective section. The label for each of the sections can be assigned by the section detection module. In some embodiments, the system can determine, responsive to executing the section detection module, that the sections include at least entities or tables. In some embodiments, executing the section detection module can include the one or more processors to identify, using the second ensemble, the sections of each sheet of the data set by performing object recognition on the images of each sheet. The one or more processors can assign, using the second ensemble, a label to each section of each sheet of the data set by parsing the text for an indication of the label.

In some embodiments, executing the section detection module can include the one or more processors to determine, using a fifth machine learning ensemble of the set of ensembles, that one or more of the sections is an entity by identifying a paired pattern of the text of each section. The one or more processors can determine, using a sixth machine learning ensemble of the set of ensembles, that one or more of the sections is a table by parsing the text of each section. In some embodiments, executing the page classification module can include the one or more processors to identify, using the third ensemble, the classifications within each sheet based on the data set by parsing the text of each sheet of the data set for a relation to the classifications. In some embodiments, the classifications can include balances and totals. In some embodiments, the system can parallelly execute the section detection module and the sheet classification module.

At least one aspect is directed to a method. The method can include receiving, by one or more processors coupled with memory, a data set including sheets in a first file type from a set of sources. The data set can be in one of a set of formats corresponding to one or more of the set of sources. The method can include identifying, by the one or more processors, a set of ensembles. Each ensemble of the set of ensembles can include one or more machine learning models and each ensemble can determine an outcome based on an outcome of each machine learning model of each respective ensemble. The method can include identifying, by the one or more processors using a first ensemble of the set of ensembles, a type for each sheet of the data set based on a vendor type and the data set. The method can include executing, by the one or more processors using a second ensemble of the set of ensembles, a section detection module to identify sections for each sheet of the data set based on the respective type for each sheet and images and text within each sheet. The method can include executing, by the one or more processors using a third ensemble of the set of ensembles, a page classification module to identify classifications within each sheet based on the data set. The method can include generating, by the one or more processors, an association between the sections and the classifications for each type of each sheet of the data set. The method can include transforming, by the one or more processors using a fourth ensemble of the set of ensembles based on the association, the sections, the classifications, and the type, the data set into a format of a second file type different from the set of formats. The method can include providing, for rendering by a display device coupled with the one or more processors, the transformed data set for integration into a capital management system.

In some embodiments, the method can include receiving, by the one or more processors, a second data set. The second data set can include a first subset of data to be an input into the one or more machine learning models and a second subset of data to compare against an output of the one or more machine learning models. The method can include generating, by the one or more processors using the first subset of data, the set of ensembles. Each ensemble of the set of ensembles can include a subset of the one or more machine learning models and each ensemble can be generated sequentially. The method can include determining, by the one or more processors using the second subset of data, that each machine learning model of each ensemble of the set of ensembles is below a threshold error. In some embodiments, the method can include determining, by the one or more processors, that an error of one or more ensembles of the set of ensembles is greater than or equal to a threshold error. The method can include aggregating, by the one or more processors, a second data set. The second data set can include a first subset of data to be an input into the one or more machine learning models and a second subset of data to compare against an output of the one or more machine learning models. The method can include generating, by the one or more processors using the first subset of data, a second set of ensembles for each ensemble of the set of ensembles with its error greater than or equal to the threshold error. Each ensemble of the second set of ensembles can include a subset of the one or more machine learning models. The method can include determining, by the one or more processors using the second subset of data, that each machine learning model of each ensemble of the second set of ensembles is below the threshold error. The method can include replacing, by the one or more processors, the set of ensembles with the second set of ensembles for each ensemble of the set of ensembles determined to have its error greater than or equal to the threshold error.

In some embodiments, the method can include validating, by the one or more processors using a fifth ensemble of the set of ensembles responsive to executing the section detection module, a label for each of the sections by comparing the text of the respective sheet to the label of the respective section. The label for each of the sections can be assigned by the section detection module. In some embodiments, the method can include executing the section detection module including identifying, by the one or more processors using the second ensemble, the sections of each sheet of the data set by performing object recognition on the images of each sheet. The method can include assigning, by the one or more processors using the second ensemble, a label to each section of each sheet of the data set by parsing the text for an indication of the label.

In some embodiments, the method can include executing the section detection module including determining, by the one or more processors using a fifth machine learning ensemble of the set of ensembles, that one or more of the sections is an entity by identifying a paired pattern of the text of each section. The method can include determining, by the one or more processors using a sixth machine learning ensemble of the set of ensembles, that one or more of the sections is a table by parsing the text of each section. In some embodiments, the method can include executing the page classification module including identifying, by the one or more processors using the third ensemble, the classifications within each sheet based on the data set by parsing the text of each sheet of the data set for a relation to the classifications. In some embodiments, the method can include executing, by the one or more processors, the section detection module and the sheet classification module in parallel.

At least one aspect is directed to a non-transitory computer-readable medium. The non-transitory computer readable medium can include instructions to cause one or more processors to receive a data set including sheets in a first file type from a set of sources. The data set can be in one of a set of formats corresponding to one or more of the set of sources. The data set can identify a set of ensembles. Each ensemble of the set of ensembles can include one or more machine learning models and each ensemble can determine an outcome based on an outcome of each machine learning model of each respective ensemble. The instructions can cause the one or more processors to identify, using a first ensemble of the set of ensembles, a type for each sheet of the data set based on a vendor type and the data set. The instructions can cause the one or more processors to execute, using a second ensemble of the set of ensembles, a section detection module to identify sections for each sheet of the data set based on the respective type for each sheet and images and text within each sheet. The instructions can cause the one or more processors to execute, using a third ensemble of the set of ensembles, a page classification module to identify classifications within each sheet based on the data set. The instructions can cause the one or more processors to generate an association between the sections and the classifications for each type of each sheet of the data set. The instructions can cause the one or more processors to transform, using a fourth ensemble of the set of ensembles based on the association, the sections, the classifications, and the type, the data set into a format of a second file type different from the set of formats. The instructions can cause the one or more processors to provide, for render by a display device coupled with the one or more processors, the transformed data set for integration into an electronic transaction system.

In some embodiments, the instructions can cause the one or more processors to validate, using a fifth ensemble of the set of ensembles responsive to executing the section detection module, a label for each of the sections by comparing the text of the respective sheet to the label of the respective section. The label for each of the sections can be assigned by the section detection module.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 7 depicts an example table associated with a data set according to a header detection module, in accordance with an illustrative embodiment.

DETAILED DESCRIPTION OF ASPECTS OF THE INVENTION

Following below are more detailed descriptions of various concepts related to, and implementations of, methods, apparatuses, and systems to digitize data via custom integrated machine learning ensembles. The various concepts introduced above and discussed in greater detail below can be implemented in any of numerous ways.

This disclosure is generally directed to digitizing a data set in a first type according to a plurality of machine learning ensembles to conform to a second type. For example, this technology can receive a data set in a first type and can filter, extract, and map the data set into a second type according to the data set and several ensembles of machine learning models. Data sets can be transferred from one system to another. Oftentimes, the data sets do not conform to a format processable by the other system. Formatting these data sets for use in the other system can be tedious due to the size of the data sets, variety of types, and intricacies of the data sets. This formatting can use large amounts of computational resources as well as be prone to error. Individually analyzing data sets to modify them to conform to an electronic transaction system can require advanced processors. These computing systems utilize large amounts of energy due to operation of the processors and cooling of the systems. These computing systems can perform continuous read/write calls to the database for accessing data sets, which is monotonous and highly prone to error due to the quantity and size of packet transfers containing the data set. Furthermore, in the event the process could be streamlined for a specific data set, the changing format of data sets from different sources would not be easily extensible to other data sets.

Systems and methods of this technical solution can use trained ensembles of machine learning models to transform the data set to be compatible with an electronic transaction system. The system can include a multitude of ensembles, each ensemble containing one or more machine learning models. The system can receive a data set incompatible with the electronic transfer system. The system can identify different types of the data set and can filter or remove subsets of the data set according to one or more of the ensembles. The system can extract, using one or more of the ensembles, parameters of the data set. The system can utilize the identified types and parameters to transform the data set for use in the electronic transaction system. Thus, by using a multitude of trained ensembles, the system can map various data sets in different types to a type compatible with the electronic transaction system, thereby reducing computational resources, onboarding time, and errors. The system can maintain the trained ensembles to be continuously and automatically adaptable for changes in the data set, thereby reducing latency due to changes in the data set.

Figure 1:
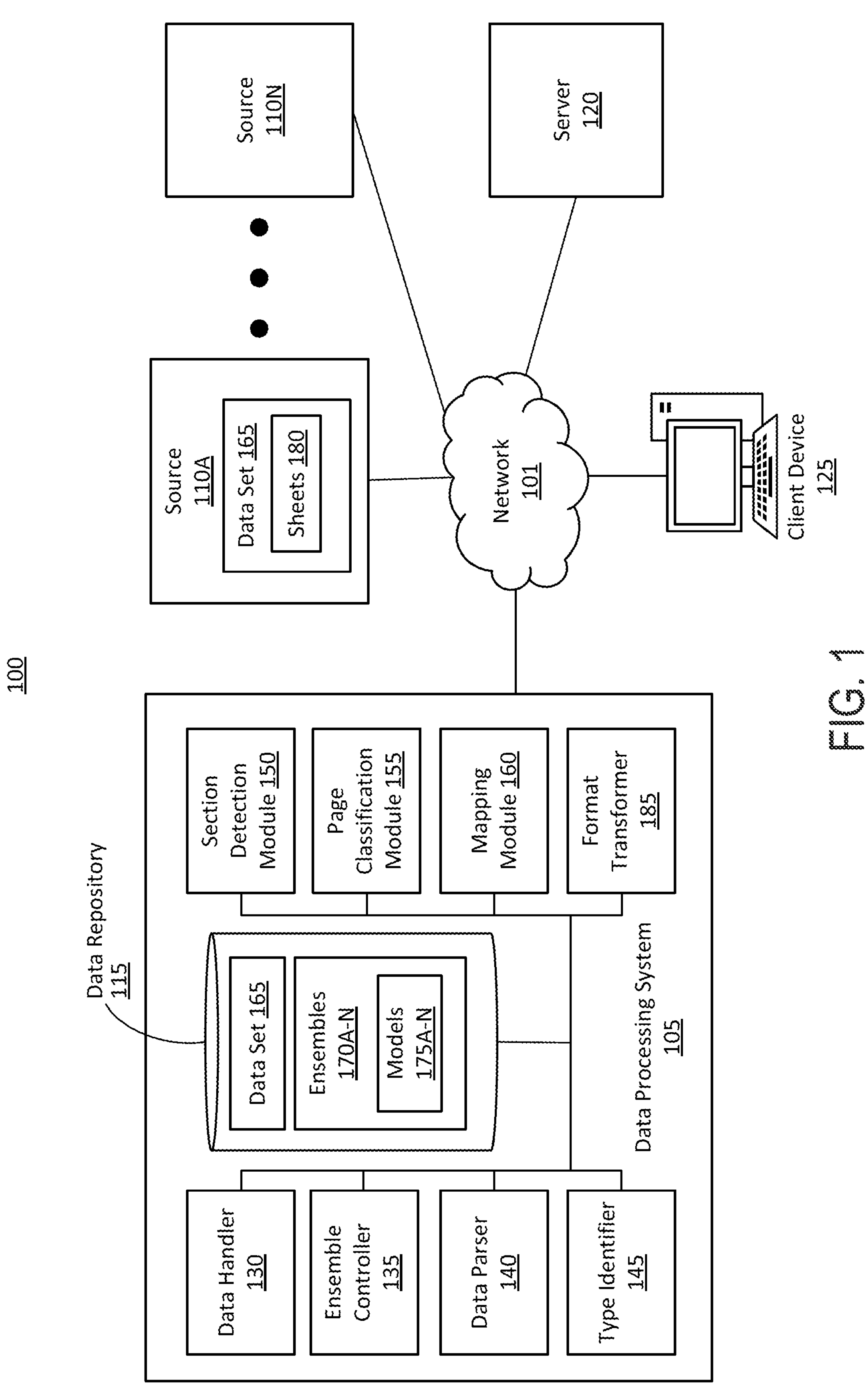
FIG. 1 depicts an example system of data digitization via custom integrated machine learning ensembles.

FIG. 1 depicts an example system 100 of data digitization via custom integrated machine learning ensembles. The system 100 can include a data processing system 105, a plurality of sources 110A-110N (which can be referred to herein as source 110 or sources 110), a server 120, a client device 125, and a network 101. The data processing system 105 can include a data handler 130, an ensemble controller 135, a data parser 140, a type identifier 145, a section detection module 150, a page classification module 155, a mapping module 160, a format transformer 185, or a data repository 115. The data handler 130, the ensemble controller 135, the data parser 140, the section detection module 150, the page classification module 155, the mapping module 160, or the format transformer 185 can each communicate with the sources 110, the server 120, or the client device 125 via the network 101.

The data repository 115 can be any memory, storage, or cache for storing information or data structures of the system 100. The data repository 115 can contain any information about the system 100 and can allow that data to be accessed by any components of the system 100, such as by communication methods described herein. The data repository 115 can contain at least a data set 165 and ensembles 170. The information in the data repository 115 can be stored in any kind of memory, such as a cloud or hard drive. The data repository 115 can include, for example, random access memory (RAM), dynamic random access memory (DRAM), static random access memory (SRAM), error-correcting code (ECC), read only memory (ROM), programmable read only memory (PROM), or electrically erasable read only memory (EEPROM). The information or data structures (e.g., tables, lists, documents, or spreadsheets) contained within the data repository 115 can be dynamic and can change periodically (e.g., daily or every millisecond); via an input from a user (e.g., a user operating the client device 125); via information from the sources 110, the server 120, or the client device 125, transmitted through the network 101; via inputs from subcomponents of the data processing system 105 (e.g., the data handler 130 or the ensemble controller 135), or via an external update to the system 100. For example, the data set 165 can change or be updated responsive to an indication from the data handler 130.

The data set 165 can be or include a set of labelled or unlabeled values corresponding to an electronic transaction system. The electronic transaction system can be an application or system operating on the client device 125 for maintaining a data set to perform a transaction. Examples of the electronic transaction system can include a system for running a payroll for a company, onboarding new employees, maintaining tax or accounting information, operating financial transfers such as payment to an employee or depositing in a bank account, transferring assets or information such as through a library or research database, maintaining medical records, maintaining legal records, or any other system or application in which data sets are manipulated or maintained.

The data set 165 can be transferred between electronic transaction systems, or from a non-electronic transaction system to an electronic transaction system. For example, a company can change from a first payroll operation system to a second payroll operation system and in doing so can transfer one or more of the data sets 165. The source 110 can be the system or computing device which transfers the data set 165, or from which the data set 165 originates. For example, the first payroll operation system of the previous example can be the source 110 if the first payroll operation system of the previous example generated or aggregated the data set 165, or if the first payroll operation system of the previous example transferred the data set 165 to the data processing system 105. Likewise, the company of the previous example can also be the source 110. For example, the company of the previous example can be the source 110 if the company generated or aggregated the data set 165, or if the company transferred or made available the data set 165 to the data processing system 105. The source 110 can include or correspond to other computing devices which can or can not be operating an electronic transaction system. For example, the source 110A can be an external computing system maintaining a database of the average salary for government employees in a specific county. In this example, the database of the salaries can be the data set 165.

The sources 110A-N (herein referred to as the source 110, or the sources 110) can transmit, to the data processing system 105 via the network 101, the data set 165. The source 110 can transmit the data set 165 to the data processing system 105 responsive to a request from the data processing system 105, periodically, or as part of a system transfer. The data set 165 can be in a format corresponding to a source, such as the source 110A. For example, the source 110 can arrange values of the data set 165 in a specified manner, such as a table, list or other defined data structure. Each source 110 can include different values for a given data set 165. For example, a first source 110A maintaining a data set 165 corresponding to demographics of library card holders can maintain different values and arrangements of those values for the data set 165 than a second source 110B including a second data set corresponding to demographics of library card holders maintains. A format for the data set 165 can be based on the source 110 from which the data processing system 105 receives it.

The data set 165 can include a plurality of values. The values can be alpha-numeric and displayable on a screen of the client device 125. For example, the data set 165 can include strings such as "First Name" or "Earnings" or "130,000" or "0.60." The data set 165 can include auditory values, such as a sound or vocal recording. The data set 165 can include colored or color-coded values. The data set 165 can include time-related values, such as a current time, elapsed time, clock-in time, among others. The data set 165 can include images. The values of the data set 165 can include any combination of values. For example, a first value of the data set 165 can include an image and a string, and a second value of the data set 165 can include an auditory value. The values of the data set 165 can relate to each other. For example, a value of "Earnings" can correspond to a value of "4,657." Some values of the data set 165 can be null or zero values. Some values of the data set 165 can be erroneous. For example, a value corresponding to a weight of an individual can be erroneous if it relays "1220 pounds."

The data set 165 can be arranged in a variety of formats. The data set can be arranged in a table, as a list, as a figure, or a combination thereof, among others. The formats can correspond to at least different attributes, sheets, arrangements, included values, sections or layouts of the data set 165. Arrangements or layouts of the data set 165 can include headers, sections, entities, tables, and blocks. Each of a header, section, entity, table, or block can be a different physical display arrangement of the values of the data set 165. A header, section, entity, table, or block can include or be included in other headers, sections, entities, tables, or blocks. For example, a table can include blocks, or a section can include or be a table. Arrangements of headers, sections, entities, tables, and blocks can be referred to as a layout of the data set 165.

The data set 165 can include sheets 180. The sheets 180 can separate subsets of the data set 165 onto a different display. For example, a first sheet can include, display, store or otherwise present values of the data set 165 from A-K and a second sheet of the data set 165 can include values of the data set 165 from L-Z. Each sheet 180 of the data set 165 can include different values, arrangements, sections, headers, layouts, or blocks. Values, arrangements, sections, headers, layouts, or blocks can repeat between the sheets 180 of the data set 165. The data set 165 can have any number of sheets 180. For example, the data set 165 can have one sheet, 1000 sheets, or no sheets. The sheets 180 can correspond to physical paper sheets, sheets of an electronic file such as a PDF, tabs of a file such as on a spreadsheet, or other sheets. Each sheet 180 can include a different layout or the same layout. The sheets 180 of the data set 165 can conform to the same file type and vendor type.

The data set 165 can include different attributes, such as a file type, data type, vendor type, or other such attributes. The data set 165 can be included in, denoted by, or transmitted as an electronic file type. Examples of electronic file types include portable document file (PDF), extensible markup language (XML), document files (DOC or DOCX), comma separated values (CSV), excel files (XLS or XLSM), data interchange format (DIF), or JavaScript Object Notation (JSON), among others. The data set 165 can be associated with or stored as a file type. The file type can determine or relate to data structures associated with the data set 165 or the layout of the data set 165.

The data type of the data set 165 can refer to a type of value within the data set 165. The data set 165 can include more than one data type within the data set 165. In some cases, a data type can correspond to a sheet of the data set 165, or one or more data types can occur or be included in one or more sheets 180 of the data set 165. The data type can be indicative, non-indicative, master data, balance data, deductions data, or other types of data. A data type can be assigned, imported, generated, or otherwise created by the data processing system 105 or a user operating through the data processing system 105. Indicative data can include pairs of data values such as "EMPLOYEE NAME" and "JOHN SMITH" or "FIRST NAME" and "MARY." Non-indicative data can include data types such as master data, earnings data, tax data, balance data, or deductions data. Master data can include values of the data set 165 relating to a company, such as a company identification number, a company name, or a listing of company employees. Balance data can include values of the data set 165 related to balancing numbers, such as budget hours, a checking account, or project hours. Earnings data can include values of the data set 165 related to profits, revenue, income, or expenditure of a company or individual. Tax data can include values of the data set 165 related to income tax, social security tax, sales tax, or other tax related values for an individual, group of individuals, or a company.

A data type can define more than one value. A data type can be defined for pairs of values, columns of values, rows of values, or other corresponding values. A grouping of values of a first data type can include subsets of the grouping of values which also correspond to a second data type. For example, a set of values of the data set 165 can correspond to a master data type. Within the master data type, there can be pairings of values which correspond to an indicative data type. In short, a data type can classify or group together corresponding values of the data set 165.

The data set 165 can include a vendor type. The vendor type can be related to the source 110 or the client device 125. For example, a first source 110A can correspond to Company A. Company A can present, store, or otherwise maintain the data set 165 in a predefined or predictable manner, such as with recurring layouts, data types, or sheets. The data set 165 can identify, be identified by, or provide an indication of the vendor type to the data processing system 105.

The data set 165 can include a report type. The report type can be related to the intention or purpose of the overall data set 165 or one or more sheets 180 of the data set 165. For example, the report type can indicate that the data set 165 is a part of a payroll register, a time keeping report, an accounting register, or an employee database, among others. The report type can be associated with a pre-defined layout, such as a number of sheets or an arrangement of the values of the data set 165. For example, a first report type can correspond to a first layout and a second report type can correspond to a second layout. The report type associated with a data set can be one or more of a set of pre-defined report types. The pre-defined report types can include Payroll Register, Payroll Register with YTD, Payroll Register with ER Taxes and Payroll Journal, among others. In some cases, the report type can be indicated by other types of the data set 165, such as the vendor type or the data type. For example, a first vendor type can be associated with one or more report types.

The data set 165 can be an input to the one or more ensembles 170A-N (herein referred to as the ensembles 170 or the ensemble 170). The ensembles 170 can operate upon the data set 165 to determine one or more outcomes of the one or more ensembles 170. The attributes of the data set 165 can each or together be an input to the ensembles 170. The data set 165 in its entirety can be an input to an ensemble of the ensembles 170, or individual or sets of the attributes, values, layouts, or sheets can be inputs to the ensembles 170. The ensembles 170 can accept inputs in addition to or instead of the data set 165. Such inputs can include a time associated with the data set 165 (e.g., a time of receipt of the data set 165 by the data processing system 105 or a time of transmittal of the data set 165 by the source 110), historical information (e.g., last receipt of a data set 165, a listing of the sources 110 that have provided a data set 165, a user profile associated with the source 110 or the client device 125, prior outcomes determined by the data processing system 105 or the ensembles 170, among others), publicly or privately available data (e.g., databases or references from outside entities such as governments, non-profits, educational institutions, or data aggregated by the data processing system 105, the client device 125, or the sources 110), user inputs (e.g., user annotations of one or more data sets 165), among others.

The one or more outcomes of the ensembles 170 can include identifications, classifications, arrangements, or other properties of the data set 165. For example, the ensembles 170 can determine a number of the sheets 180 of the data set 165, entities associated with the data set 165, or the report type of a subset of the values of the data set 165. The ensembles 170 can identify null or void values of the data set 165 as an outcome. The ensembles 170 can identify the source 110 or the vendor type of the data set 165. The ensembles 170 can determine a combination of attributes and other properties of the data set 165.

A first ensemble 170A can use as input one or more outcomes of a second ensemble 170B. The ensembles 170 can generate the outcomes sequentially, in parallel, or in a combination thereof. For example, a first ensemble 170A can determine a first outcome concurrently with a second ensemble 170B determining a second outcome. In this illustrative example, a third ensemble 170C can determine a third outcome responsive to the first ensemble 170A determining the first outcome, responsive to the second ensemble 170B determining the second outcome, responsive to both the first ensemble 170A and the second ensemble 170B determining the first and second outcomes respectively, or independently of the first and second ensemble altogether. This order or sequence of ensemble operation is exemplary, and it should be understood that any combination of parallel and series operation of the ensembles 170 is possible.

The ensembles 170 can include one or more models 175A-N (herein referred to as the models 175 or the model 175) to accept the inputs to produce the outcomes. The models 175 can be machine learning models. The machine learning models and their inputs can be common across the ensembles 170. For example, a first ensemble 170A can include a first model 175A, and a second ensemble 170B can also include the first model 175A. In this illustrative example, the first ensemble 170A and the second ensemble 170B can include different or further models 175B-N. The first ensemble 170A and the second ensemble 170B can accept the same inputs, different inputs, or a combination of overlapping and non-overlapping inputs for input to the same or different of the models 175 contained within each ensemble 170. The ensembles 170 can include overlapping models 175, or exclusive models 175. A first overlapping model 175 can undergo different training, accept different inputs, or produce a different outcome from a second overlapping model 175. For example, a first model 175A containing a first machine learning algorithm of a first ensemble 170A can accept the sheets 180 of the data set 165 as input, and a second model 175B containing the first machine learning algorithm of a second ensemble 170B can accept the sheets 180 of the data set 165 as input. In this illustrative example, the first machine learning model 175A can produce a different outcome than the second machine learning model 175B, despite each model containing the same machine learning algorithm.

The models 175 can be a set of machine learning models. The machine learning models 175 can include machine learning algorithms, equations, calculations, or models trained to determine an outcome based on an input. The models 175 can include neural networks, decision-making models, linear regression models, random forests, classification models, reinforcement learning models, clustering models, neighbor models, decision trees, probabilistic models, classifier models, or other such models. For example, the models 175 can include natural language processing (e.g., support vector machine (SVM), Bag of Words, Counter vector, Word2Vec, k-nearest neighbors (KNN) classification, long short term memory (LSTM)), object detection and image identification models (e.g., mask region-based convolutional neural network (R-CNN), CNN, single-shot detector (SSD), deep learning CNN with Modified National Institute of Standards and Technology (MNIST), RNN based long short term memory (LSTM), Hidden Markov Models, You Only Look Once (YOLO), LayoutLM), classification ad clustering models (e.g., random forest, XGBoost, k-means clustering, DBScan, isolation forests, segmented regression, sum of subsets 0/1 Knapsack, Backtracking, Time series, transferable contextual bandit) or other models such as named entity recognition, *Saccharomyces* Genome Database (SGD), term frequency-inverse document frequency (TF-IDF), stochastic gradient descent, Naïve Bayes Classifier, cosine similarity, multi-layer perceptron, sentence transformer, date parser, conditional random field model, Bidirectional Encoder Representations from Transformers (BERT), Elmo, fastText, XLNet, SuperGLUE, SQUAD2.0, among others. It should be understood that this listing of machine learning models is exemplary and is not to be construed as exhaustive or limiting.

Each model of the models 175 can be trained to analyze, recognize, or identify the data set 165. Each ensemble of the ensembles 170 can include one or more of the models 175. Each model of a first ensemble 170A can determine an outcome for the first ensemble 170A. In some embodiments, the first ensemble 170A can determine or include more than one outcome from the models 175 contained therein. In some embodiments, the first ensemble 170A can determine or include a finite amount of outcomes. The ensemble 170A or the models 175 contained therein can determine a finite number of outcomes from each of the outcomes of each machine learning model 175. The ensemble 170A or the models 175 can determine the finite outcomes based on validation, voting, weighting, or other means.

As an illustrative example, the first ensemble 170A can include a set (e.g., three) machine learning models 175A-C. Each of the models 175A-C can determine one or more outcomes, for example, five outcomes. The first ensemble 170A can identify a finite number (e.g., one or two) of the outcomes from the machine learning models 175A-C as final or overall outcomes. The first ensemble 170A can apply a weight to each of the models 175A-C or their outcomes to determine the overall outcomes. The first ensemble 170A or the models 175A-C can perform a majority vote. That is to say, the modal outcome of the outcomes of the models 175A-C can be the overall outcome. An operation of the model's outcomes can determine the overall outcome. For example, the ensemble 170A can utilize summation, averaging, or other such operation to determine the overall outcomes. The ensemble 170A can select the overall outcomes randomly, such as by an equal probabilistic rating of each outcome of each model. The ensemble 170A can select the overall outcomes through validation by a fourth machine learning model 175D. The fourth machine learning model 175D can break a tie between the set of machine learning models 175A-C, or otherwise determine which outcomes of the models 175A-C to select as the overall outcomes for the first ensemble 170A.

The data handler 130, the ensemble controller 135, the data parser 140, the type identifier 145, the section detection module 150, the page classification module 155, the mapping module 160, or the format transformer 185 can each include at least one processing unit or other logic device such as programmable logic array engine, or module configured to communicate with the data repository 115 or database. The data handler 130, the ensemble controller 135, the data parser 140, the type identifier 145, the section detection module 150, the page classification module 155, the mapping module 160, or the format transformer 185 can be separate components, a single component, or part of the data processing system 105. The system 100 and its components, such as a data processing system 105, can include hardware elements, such as one or more processors, logic devices, or circuits.

The data processing system 105 can interface with, communicate with, or otherwise receive or provide information with one or more of the sources 110, the client device 125, or the server 120. The data processing system 105 can include at least one logic device such as a server 120. The server 120 can be a computing device having a processor to communicate via a network 101. The data processing system 105 can include or interface with the at least one server 120. The server 120 can be a computation resource, server, processor or memory. For example, the data processing system 105 can include a plurality of computation resources or processors. The server 120 can facilitate communications between the data processing system 105, the sources 110, and the client device 125 via the network 101.

The network 101 can be a wireless or wired connection for enabling the data processing system 105 to store, transmit, receive, or display information to identify, extract, and map a data set from a first type to a second type. The data processing system 105 can communicate with internal subcomponents (described herein) or external components (e.g., the server 120, the source 110, or the client device 125, among others) via the network 101. The data processing system 105 can, for example, store data about the system in data repository 115. The data processing system 105 can, for example, receive the data set 165 transmitted by the source 110A. The network can include a hardwired connection (e.g., copper wire or fiber optics) or a wireless connection (e.g., wide area network (WAN), controller area network (CAN), local area network (LAN), or personal area network (PAN)). For example, the network 101 can include WiFi, Bluetooth, BLE, or other communication protocols for transferring over networks as described herein.

In an illustrative example, the data processing system 105 can execute on the data set 165 to transform the data set 165 to a format compatible with an electronic transaction system. The data handler 130 can receive the data set 165 from one or more sources 110 in a first file type. The ensemble controller 135 can identify, train, and modify the ensembles 170. The data parser 140 can filter a subset of data from the data set 165. The type identifier 145 can identify a report type of the data set 165. The section detection module 150 can identify sections of the data set 165. The page classification module 155 can identify a type for each sheet of the data set 165. The mapping module 160 can generate associations between values of the data set 165. The format transformer 185 can transform the data set 165 from the first file type in a first format to a second file type in a second format based on the outcomes of the subcomponents of the data processing system 105.

The data processing system 105 can include a data handler 130 designed, constructed and operational to receive, identify, obtain, or otherwise access the data set 165. The data handler 130 can be any combination of hardware and software for collecting, storing, processing, identifying or receiving information or data of the data set 165 from the sources 110. For example, the data handler 130 can accept the data set 165 transmitted from the source 110. The data handler 130 can retrieve, query, aggregate, or otherwise obtain the data set 165 from the source 110. The data handler 130 can receive the data set 165 from the source 110 via the network 101, a non-transitory computer-readable medium (e.g., a flash drive, CD-ROM, external hard drive, or other such physical data transfer medium), or via user inputs to the data processing system 105 via a user interface associated with the data processing system 105.

The data handler 130 can retrieve or receive the data set 165 from the source 110 at regular or irregular intervals. Receiving or retrieving the data set 165 can refer to receiving the entire data set 165, or subset of the data set 165. For example, the data handler 130 can retrieve or receive the data set in its entirety at once from the source 110, or in correlated or non-correlated subsets (e.g., values related to income followed by values related to taxes). The data handler 130 can aggregate the data set 165 or values of the data set 165 over a period of time. The data handler 130 can receive or retrieve the data set 165 as values are updated or added. For example, the data handler 130 can receive the values of the data set 165 responsive to values of the data set 165 being changed, deleted, added, or otherwise modified by the source 110. The data handler 130 can receive or retrieve the entire data set 165 upon a modification of the data set by the source 110, or can receive only the modified values of the data set 165.

The data handler 130 can receive or retrieve more than one data set from a source 110A. For example, the data handler 130 can receive a first data set 165 from the source 110A at a first time and can receive a second data set 165' (not pictured) from the source 110A at a second time. The data handler 130 can receive, retrieve, or aggregate the data set 165 periodically (e.g., every minute, every week), responsive to a change or modification of the data set 165 by the source 110, from a push or request from the source 110 to collect the data set 165, by a request (e.g., as implemented by a user or the client device 125), or by a push or query from a subcomponent of the data processing system 105 (e.g., by the ensemble controller 135 instructing the data handler 130 to retrieve the data set 165). The data set 165 can be associated with a time stamp. The data handler 130 can receive the data as a data stream or real-time data feed. The data handler 130 can ping or poll the source 110 for the data set 165. The data handler 130 can store the data set in the data repository 115. The data handler 130 can access and modify the data repository 115 to store or alter the various data sets 165 collected.

The data processing system 105 can include an ensemble controller 135 designed, constructed and operational to train, maintain, identify, or operate the ensembles 170 and the models 175. The ensemble controller 135 can train the models 175 of the ensembles 170 using one or more of the data sets 165 or values thereof. The ensemble controller 135 can maintain, update, or retrain the models 175 of the ensembles 170. The ensemble controller 135 can identify the ensembles 170 for use by other subcomponents of the data processing system 105. The ensemble controller 135 can store or modify the ensembles 170 and the models 175 in the data repository 115.

The ensemble controller 135 can train the models 175 associated with the ensembles 170. The ensemble controller 135 can establish or generate the models 175 and the ensembles 170 using one or more of the data sets 165. The ensemble controller 135 can instruct the data handler 130 to aggregate the data set 165 to train, generate, or establish the models 175 of the ensembles 170. The ensemble controller 135 can instruct, cause, or push the data handler 130 to receive or retrieve the data set 165 at any time for training the models 175 of the ensembles 170. The ensemble controller 135 can train the models 175 using the data set 165, a subset of the data set 165, historical data, input data by a user (e.g., such as annotations by the user from a user annotation tool), or others of the inputs described herein. The ensemble controller 135 can segment, subsect, divide, or otherwise create subsets of the data set 165 to train the models 175 of the ensembles 170. The ensemble controller 135 can divide the data set 165 based on a percentage of information. For example, the ensemble controller 135 can divide the data set 165 into two subsets wherein the first subset can include 30% of the digital information in GB and the second subset includes 70% of the information in GB. The ensemble controller 135 can divide the data set 165 based on data type, number of sheets, type of source, among others. The ensemble controller 135 can divide the data set into a training data set and a test data set.

The ensemble controller 135 can feed, supplement, or provide the training data set as inputs to the models 175 to train the models 175. The inputs can be or include the inputs as described herein in addition to the training data set. The ensemble controller 135 can use the training data set to train the models 175 based on known outputs of the training data set. The training data set can be annotated by a user or otherwise have known outputs or outcomes. By providing the training data set with the inputs and known outputs to the models 175, the ensemble controller 135 can generate the trained models 175. For example, the training data set 165 can include a data set 165 with a large variety of data types, sheets, layouts, sections, vendors, or other attributes. The training data set can be marked to distinguish each attribute of the training data set. The ensemble controller 135 can then generate the trained models 175 by providing the inputs to create the known outputs. This process can be iterative and can utilize any of the inputs or machine learning models described herein.

The ensemble controller 135 can validate the trained models 175 using the test data set. With generation of the ensembles 170 of the models 175, the ensemble controller 135 can provide inputs based on the test data set to determine a validity of each of the models 175. The validity of each of the models 175 can relate to an error. The error can be the difference between the known outcomes of the test data set and actual outcomes when inputs based on the test data set are provided to the models 175. For example, the test data set can include a known input and outcome. Upon providing the known input to a model trained to accept that input, the model 175 can provide the known outcome, or can provide a different, erroneous outcome. This comparison between the known outcome and the model-generated outcome can be repeated for various inputs of a model 175 to generate an overall error score or rate. The error score or rate can relate to the validity of the model. If the error score or rate for the model 175 exceeds a threshold error, the model can be considered invalid or erroneous. If the error score or rate for the model 175 is at or below the threshold error, the model 175 can be considered valid. In this manner, each model 175 of each ensemble 170 can be validated.

The ensemble controller 135 can retrain the models 175. The ensemble controller 135 can retrain the models 175 responsive to the error score of the one or more models 175 being above a threshold error. In some cases, the ensemble controller 135 can determine that the error score of the models 175 is above the threshold error (e.g., invalid) responsive to generation of the models 175 by the ensemble controller 135. For example, the ensemble controller 135 can determine that a model 175A of the models 175 is invalid based on an error score of the model 175A exceeding an error threshold for the model 175A upon generation. In some embodiments, the ensemble controller 135 can determine that the models 175 are invalid prior to the ensemble controller 135 identifying the models 175. The ensemble controller 135 can determine that the models 175 are invalid prior to storing the models 175 in the data repository 115. The ensemble controller 135 can check the models 175 periodically to determine validity of the models 175. For example, a model 175A which was once valid can drift, or become less valid or have a higher error score over time. The ensemble controller 135 can determine that the models 175 are invalid or above a threshold error at any time. The ensemble controller 135 can check the validity of the models 175 stored in the data repository 115, the models 175 generated by the ensemble controller 135, or other models 175 of the system 100.

Upon the ensemble controller 135 determining that one or more models 175 of the ensembles 170 are invalid (e.g., the error score is above the threshold error), the ensemble controller 135 can instruct the data handler 130 to aggregate, collect, or retrieve a second data set 165'. With receipt of the second data set 165', the ensemble controller 135 can retrain the models 175. The ensemble controller 135 can divide the second data set 165' into subsets, such as a second training data and a second test data. The ensemble controller 135 can combine the data set 165 and the second data set 165'. The ensemble controller 135 can combine subsets of the data sets 165 and 165'. For example, the ensemble controller 135 can incorporate, combine, or add the second training data of the second data set 165' to the training data of the data set 165. With the aggregation of the second data set 165', the ensemble controller 135 can provide further inputs and known outcomes to further train the models 175. The ensemble controller 135 can retrain the models 175 with an error score above the threshold error, all of the models 175, or selected models 175. The ensemble controller 135 can train the models 175 or a subset of the models 175 subsequent to the elapse of a period of time. For example, the ensemble controller 135 can retrain a model 175A every week, a model 175B every year, a model 175C upon its error score exceeding the threshold error for the model 175C, or never retrain a model 175D.

The ensemble controller 135 can check the retrained models 175 for validity. The ensemble controller 135 can check or test the retrained models 175 as described herein, by comparing an error score of each model 175 with a threshold error for each model 175. Upon the ensemble controller 135 determining that one or more of the retrained models 175 are invalid, the ensemble controller 135 can aggregate a third data set 165" and repeat the retraining process. The retraining process can be repeated until the error score of the model 175 is below the threshold error. The ensemble controller 135 can issue an alert or notification if the model 175 fails testing or retraining a threshold number of times.

Upon the ensemble controller 135 determining that the retrained models 175 or the trained models 175 are valid, the ensemble controller 135 can store the models 175 in the data repository 115. In some cases, the ensemble controller 135 can replace a first model 175A with a retrained model 175B. The ensemble controller 135 can replace the first model 175A with the retrained model 175B based on user input, or based on the first model 175A having an error score above the threshold. In this manner, models 175 which have drifted, become erroneous, or no longer represent the data set 165 can be replaced by the ensemble controller 135 to ensure validity of the system 100.

The ensemble controller 135 can generate and validate the models 175 in parallel, series, or a combination thereof. For example, the ensemble controller 135 can generate, validate, or store a first model 175A concurrently with a second model 175B. The ensemble controller 135 can generate, validate, or store a first model 175A prior to the generation of a second model 175B. In some implementations, a subsequent model can use as input an outcome of a prior model. In these implementations, the ensemble controller 135 can generate, validate, or store the subsequent model after the prior model.

Upon receiving the data set 165 (different from the data set used to train the models 175), the ensemble controller 135 can identify the ensembles 170. Identifying the ensembles 170 can refer to the ensemble controller 135 accessing, retrieving, or making available the ensembles 170 for the data processing system 105. Identifying the ensembles 170 can refer to the ensemble controller 135 selecting or determining an order of operation of the ensembles 170 on the data set 165. The ensemble controller 135 can identify, make available, or provide an ensemble 170 to the data parser 140.

The data processing system 105 can include a data parser 140 designed, constructed and operational to filter, curate, or scrub the data set 165 using an ensemble 170. The data parser 140 can remove, delete, or modify duplicate values or arrangements of the data set 165. The data parser 140 can identify a number of sheets of the data set 165. The data parser 140 can filter the data set 165 based on one or more thresholds of the ensemble 170.

The data parser 140 can use an ensemble 170 including one or more of the models 175. The data parser 140 can take as input for the ensemble 170 the data set 165. The data parser 140 can determine, identify, or recognize the sheets 180 of the data set 165. The data parser 140 can analyze each sheet of the sheets 180 to determine or identify junk within the data set 165. Junk can include blank rows, columns, or sheets of the data set 165; erroneous values or blank values; or duplicate values, sheets, rows, or columns, among others.

With identification of the junk within the data set 165, the data parser 140 can remove, delete, or otherwise modify the data set 165. The data parser 140 can remove, delete, or modify the junk to remove it from the data set 165. For example, the data parser 140 can identify a blank column within an arrangement of the data set 165 and can delete that column. The data parser 140 can identify and remove extraneous values, such as a repeated or duplicate column or header. For example, the data parser 140 can determine that a sheet of the sheets 180 is a duplicate sheet and can delete the duplicate sheet from the data set 165. The data parser 140 can identify or remove superfluous values from the data set 165 or a sheet of the data set 165. For example, the data parser 140 can identify that a value of a sheet does not a correspond to an input of any of the ensembles 170 and can remove the superfluous data as a result. In this manner, the data set 165 can be scrubbed to facilitate faster and more accurate processing of the data set by the other components of the data processing system 105, such as type identifier 145.

The data processing system 105 can include a type identifier 145 designed, constructed and operational to identify a report type of the data set 165 using a first ensemble 170A. The type identifier 145 can be any combination of hardware and software to identify the report type. The type identifier 145 can identify attributes of the data set 165, such as a vendor type, data type, or report type. The type identifier 145 can use the attributes to determine the layout of the data set 165 or other attributes of the data set 165. Identifying the type can refer to recognizing, by the first ensemble 170A, attributes of the data set 165 and labelling the attributes. Identifying the type can refer to recognizing, by the first ensemble 170A, an arrangement, layout, or position of values of the data set 165 or attributes of the data set 165.

The type identifier 145 can identify the types or attributes by using the first ensemble 170A. The first ensemble 170A can include one or more models 175 to detect types, subsets, arrangements, or positions of values of the data set 165 for each sheet of the data set 165. One or more models 175 of the first ensemble 170A can include Sentence Transformer, which can compute a dense vector representation for the values of the data set 165 to identify the report type of the data set 165. For example, one or more of the models 175 of the first ensemble 170A can parse text-based values of the data set 165 such as a sentence, word, or individual letter to classify the data set 165 as a report type. The type identifier 145 can use one or more models 175 of the first ensemble 170A to parse text or strings of the data set 165, such as text or string values of the data set 165, in order to determine the report type. In some cases, the report type can indicate or include a layout for the data set 165. The type identifier 145 can use one or more models 175 of the first ensemble 170A to determine the type using the vendor type or data type of the data set 165.

The type identifier 145 can identify a vendor type or a data type for the data set 165. The type identifier 145 can identify the vendor type or data type using the first ensemble 170A, by using another ensemble 170N, or a combination thereof. The type identifier 145, through the first ensemble 170A or the other ensemble 170N, can use object recognition or text parsing models 175 as described herein to identify the vendor type or data type. The type identifier 145 can identify the vendor or data type by identifying image or text values of the data set 165 and matching the identified image or text values to a pre-defined library of image or text values for similarity. If the image and text values are at or above a similarity threshold, the value can be classified as a particular data type or vendor type. Likewise, the type identifier 145 can recognize an identifier value of the data set 165, and can classify a sheet, value, or the data set 165 based on the identifier value. For example, an identifier value can include strings such as "LLC," "LLP" "Corporation" to indicate a vendor type.

The type identifier 145 can, upon identifying the vendor type, classify the data set 165 into a vendor type. The type identifier 145 can classify the data set 165 into a vendor type for each sheet of the data set 165. A vendor type can include a name or identifier of the source 110, a company, or an individual, among others. Each sheet of the data set 165 can correspond to a different vendor type.

The type identifier 145 can, upon identifying the data type, classify the data set 165 or subsets of the data set 165 into one or more data types. Classifying the data set 165 or subsets of the data set 165 into the one or more data types can include labelling the values corresponding to the identified data type with a predefined label. Examples of predefined labels include indicative data, non-indicative data, indicative master, balance info, tax info, among others described in conjunction with the data types herein. In the event that a value, sheet, or subset of the data set 165 does not correspond to a data type, report type, or vendor type, the type identifier 145 can flag the values for inspection by a validation ensemble or a system operator. The validation ensemble can execute further models to determine the data type, report type, or vendor type. The system operator can annotate the unidentified values as a data type or vendor type, can input a new data type, report type or vendor type, or can disregard or remove the unidentified values.

The type identifier 145 can identify the report type based on the identified vendor type, data type, the data set 165, or a combination thereof. The type identifier 145 can use the first ensemble 170A to determine, based on the identified attributes and the data set 165, the report type by parsing text values of the data set 165. By identifying the report type, further ensembles 170 and components of the data processing system 105 can receive more refined inputs for their processing, such as the section detection module 150.

The data processing system 105 can include a section detection module 150 designed, constructed and operational to identify sections of the data set 165 using a second ensemble 170B. The section detection module 150 can be any combination or hardware and software to identify sections of the data set 165. Identifying the sections can refer to identifying subsets of the layout of the data set 165 for each sheet according to at least the report type. The section detection module 150 can identify the sections based on the report type, data type, vendor type, the values of the data set 165 (such as images, text, or other values) or the sheets 180. The section detection module 150 can identify, using an ensemble of the ensembles 170, tables and entities of each section of each sheet of the data set 165. The section detection module 150 can classify the identified sections into tables or entities or the section detection module 150 can classify the tables and entities of each sheet to identify the sections.

The section detection module 150 can, using the second ensemble 170B, identify sections for each sheet of the data set 165 based on the report type. The report type can be associated with the values of the data set 165. The report type can be associated with text, images, or other values. The section detection module 150 can parse the values of the data set 165 to identify the sections. For example, the section detection module 150 can use image recognition to analyze the data set 165 for arrangements of different values related to sections. The second ensemble 170B can include one or more of the models 175. In some cases, the models 175 of the second ensemble 170B can include object detection, instance segmentation or image recognition models such as Detectron2, CascadeTabNet, YOLOv5, or Layout LM v1.

Each section of the identified sections can include a subset of the data set 165. For example, a section can include all of some of the values of the data set. A section can include values corresponding to a data type, values arranged in a predefined order, values corresponding to a header or other value, among others. The sections can correspond to locations or arrangements of the values within each sheet of the data set. One or more sections of a sheet can be one or more tables. The tables can be values of the data set 165 arranged in corresponding rows and columns. For example, a table can include headers (e.g., titles or names) of rows or columns which correspond to or define values aligned with the headers. One or more sections of a sheet can be one or more entities. An entity can be referred to as a key-value pair. An entity can be two values of the data set 165 which relate to each other. In some cases, one value of the entity can be a title or label, and the second value can be information associated with the first value. For example, an entity can include a first value "NAME" and a second value "JOHN," or an entity can include a first value "SALARY" and a second value "$50,000."

In some cases, the section detection module 150 can identify headers of the identified tables. The headers can be a titular apex of a group of related values of the data set 165, such as a table. For example, a header can be a string value titling, labelling, or otherwise marking a set of values of the data set 165. For example, the header can read "FIRST NAME" and the values associated with the header can include "JOHN," "MARY," and "CHRIS." In some implementations, the values associated with the header can be located below, besides, or above the header. In this manner, the header can denote or indicate a type of value. The headers can include predetermined labels or classifications. Examples of header labels include header rows, data rows, sub header rows, preamble rows, or total rows.

The section detection module 150 can identify nested headers. Nested headers can be headers hierarchically arranged under different headers. A nested header can be a value included within the values associated with the header which also is a header. For example, a header could denote "NAMES" and a nested header could denote "FIRST NAMES." Headers can be continuously nested. For example, a primary header could read "OUTGOING", a secondary header nested within the primary header could read "TAXES," and a tertiary header nested within the secondary header could read "STATE TAXES." In other words, values of the data set 165 can be associated with more than one header. The section detection module 150 can, using the second ensemble 170B, identify and separate nested headers of the data set 165. The section detection module 150 can determine the values associated with each header of the nested headers and can map or extract the headers which match with the predetermined header classifications. In this manner, the section detection module 150 can associate one header of the nested headers for the corresponding values of the data set 165.

The section detection module 150 can identify duplicate headers. The section detection module 150 can identify duplicate headers from the values of the data set 165 or from the classifications assigned to the identified headers. Upon detection of the duplicate headers, the section detection module 150 can remove the duplicate headers. Removing the duplicate headers can include deleting or removing the duplicate headers from memory, hiding the duplicate headers while still maintaining them in memory, or marking the duplicate headers to not be used as input for the ensembles 170. The section detection module 150 can remove the duplicate headers itself by deleting, modifying, or otherwise editing the data set 165, or the section detection module 150 can instruct another component of the data processing system 105. For example, the section detection module 150 can instruct the data parser 140 to remove the duplicate headers from the data set 165.

In some cases, the models 175 of the second ensemble 170B can individually or in combination classify the sections of the data set 165. The section classifications can include tables or entities. The tables or the entities can include further or subclassifications such as earnings, taxes, deductions, net_pay, company_info, date_info, department, totals, company_totals, report_totals, employee_totals, check_totals, or totals, among others. A sheet of the data set 165 can include tables and entities, just tables, just entities, or no tables or entities. The section detection module 150 can identify entities and tables in parallel, or the section detection module 150 can identify entities or tables subsequent to identifying other entities or tables. For example, the section detection module 150 can identify the tables of the identified sections and then identify the entities of the non-table sections. Alternatively, the section detection module 150 can identify the entities of the identified sections and then identify the tables of the non-entity sections.

The section detection module 150 can perform section validation. The second ensemble 170B can include a model to perform validation of the identified sections. The section detection module 150 can perform section validation concurrently with identifying the sections (e.g., as each section is identified), as groups of sections are identified, or subsequent to the section identification. The section detection module 150 can perform the section validation to classify the identified sections, or to perform a check of the classifications associated to the sections. In some cases, the section detection module 150 can incorrectly classify the sections. The section detection module 150 can incorrectly classify the sections if, for example, there is an error in the inputs to the second ensemble 170B (e.g., a blurry or unclear image of the data set 165, missing values of the data set 165, among others), or if one or more models 175 of the second ensemble 170B perform above their threshold errors, among others. The section detection module 150 can perform the section validation to check for missed or overlooked sections of the data set 165. For example, one or more of the models 175 of the second ensemble 170B can fail to identify a section of one or more sheets 180 of the data set 165. The section detection module 150 can fail to identify a section of the data set 165 if one or more models 175 of the second ensemble 170B is performing above its error threshold, if an image associated with the section or the section itself is blurry or otherwise illegible, if there is a discontinuity in passing the data set 165 to the section detection module 150, among other reasons. Through section validation, the section detection module 150 can identify, classify, and validate the section which failed initial identification.

The section detection module 150 can validate the sections through the second ensemble 170B, a fifth ensemble 170E, or by one or more models 175 of the aforementioned ensembles associated with validation. The section detection module 150 can parse the values associated with the identified sections to determine the validity of the section. The validity of the section can refer to the subset of the data set 165 identified as the section being a section, or the validity of the section can refer to the right association of classifications with the section. In some cases, the section detection module 150 can use one or more ensembles 170 (such as the fifth ensemble 170E) to parse text of the identified sections (e.g., text-based values of the data set 165) to validate the identified sections. For example, the section detection module 150 can use an ensemble of machine learning models such as SBERT, Hugging Face NER, or Date Parser to validate the sections.

In some cases, the section detection module 150 can validate the sections by using the fifth ensemble 170E to compare the classification of the section (e.g., table or entity) to the text contained within the identified section to determine the validity of the section. For example, the values of the data set 165 contained within a first section can include text, images, or other values which relate to one or more labels. The section detection module 150 can validate the sections by comparing the values of the first section to the assigned label of the first section. If a number of the values of the section (e.g., a quantity of values, a percentage of values) is above a threshold number for the assigned label, the section detection module 150 can validate the section.

The section detection module 150 can assign classifications to the identified sections based on the values of the data set 165 contained within the sections or the classifications assigned during identification of the sections by the section detection module 150. For example, the section detection module 150 can validate the sections to assign classifications or labels such as employee info, company info, date info, or department info to the sections or to values contained within the sections.

The section detection module 150 can not identify or validate any sections, tables, or entities. The section detection module 150 can determine that no sections, tables, or entities are within one or more sheets of the data set 165 using the data set 165 or the report type as an input to the second ensemble 170B. The second ensemble 170B can not return an outcome, or can return an outcome which does not match with the subclassifications for the sections. In the event the section detection module 150 does not identify any sections, tables or entities, the data processing system 105 can proceed to classifying the sheets 180 of the data set 165 via the page classification module 155.

The data processing system 105 can include a page classification module 155 designed, constructed and operational to classify each sheet of the data set 165 using a third ensemble 170C. The page classification module 155 can be any combination of hardware and software to identify or assign classifications to the sheets 180 of the data set 165 based on the values of the data set 165 or the sections identified by the section detection module 150. Classifying the sheets 180 can include assigning labels, classifications, or pre-defined header categories to the headers of the data set 165.

The page classification module 155 can evaluate each sheet of the data set 165 to develop embeddings (e.g., dense vector representations) of the values in each sheet to converge on the sheet classifications. The page classification module 155 can use the third ensemble 170C including the one or more models 175 to group together similar (e.g., in meaning, definition, length, syntax, format, font, or common letters) text-based values identified in the data set 165 for each sheet. By generating groupings of similar text-based values in a dense-vector representation, the page classification module 155 can identify which pre-defined categories apply (if any) to each grouping based on characteristics common to the groupings. In some cases, the models 175 of the ensemble 170B can include the models 175 to parse the data set 165 for each sheet to generate the groupings of similar text-based values to determine which pre-defined categories or labels to apply to each grouping. In some cases, the pre-defined categories can include balances, totals, or balances and totals. For example, the page classification module 155 can classify one or more sheets 180 of the data set 165 as "balances" if a threshold number of values of the sheet or groupings of similar text-based values corresponds to the classification "balances." For example, the page classification module 155 can classify one or more sheets 180 of the data set 165 as "balances and totals" if a threshold number or range of the values of the sheet or groupings of similar text-based values corresponds to the classification "balances and totals."

The page classification module 155 can take as input the identified sections, the data set 165, the report type, the data type, the vendor type, or a combination thereof for each sheet of the data set 165 to converge on the classifications. For example, the third ensemble 170C of the page classification module 155 can determine, through a dense vector representation where the components of the input are used to generate groupings of similar values, the classifications of the sheets 180 for each sheet. The ensemble 170C can identify features of the data set 165 such as a format of the values (e.g., text, image, etc.), or a feature associated with the format (e.g., bold or italicized text, color or black and white images).

In some cases, the page classification module 155 can operate or perform its functions detailed herein concurrently (e.g., parallelly) with the section detection module 150. For example, the page classification module 155 can take as input the sections identified or classified by the section detection module 150. For example, the section detection module 150 can take as input the classified sheets 180 of the page classification module 155. The page classification module 155 and the section detection module 150 can iteratively provide their respective outputs as inputs to each other. The execution of the page classification module 155 and the section detection module 150 can occur in stages. As an illustrative example, the page classification module 155 can identify the classifications for each sheet of the data set 165 and can provide the classifications of the sheets at any interval or grouping to the section detection module 150. The section detection module 150 can, concurrently or sequentially, provide the identified, classified, or validated sections to the page classification module 155. With receipt of the outputs from each module, the section detection module 150 and the page classification module 155 can update or re-determine their outputs. As an example, upon receipt of the sections by the page classification module 155, the page classification module 155 can take as input the sections and provide an updated output of the classifications for the sheets 180. Likewise, upon receipt of the classifications of the sheets 180 from the page classification module 155, the section detection module 150 can take as input the sheet classifications and provide an updated output of the sections. In this manner, the page classification module 155 and the section detection module 150 can iteratively detect sections and assign classifications.

The data processing system 105 can include a mapping module 160 designed, constructed and operational to generate or identify associations between the values of the data set 165. The mapping module 160 can be any combination of hardware and software to generate associations of the data set 165 according to one or more of the identified sections, page classifications, report type, data type, or vendor type. Generating the associations can refer to generating a relational table, clusters, classifications, or other such relationships for the data set 165. Generating the associations can include assigning labels, classifications, or pre-defined categories to subsets of the data set 165. For example, generating the associations can include marking the identified sections of a first sheet as relating to a value of a second sheet of the data set 165.

In some cases, the mapping module 160 can generate one or more associations between the sections and the sheet classifications for each section of each page of the data set 165. The mapping module 160 can generate multiple associations per sheets. For example, the mapping module 160 can generate an association between a first value of a first section of a first sheet, a second value of a second section of a second sheet, and a third value of a second section of the second sheet. Furthermore, the mapping module 160 can generate associations between sections or subsets of sections. For example, the mapping module 160 can generate associations between a first section of a first sheet and a subset of a second section of a first sheet.

As an illustrative example, the mapping module 160 can generate associations for a data set 165 including information about a set of employees. A first sheet of the data set 165 can include a listing of employees and personal information of each employee, such as name, job title, location and salary. A second sheet of the data set 165 can include information pertaining to payroll totals for a set of locations. In some cases, the mapping module 160 can generate associations between an employee of a location and the payroll for that location. As another illustrative example, the mapping module 160 can generate associations for a data set 165 including information about libraries. A first sheet of the data set 165 can include a listing of library card holders and their due late fee balances for a library system. A second sheet of the data set 165 can include the balances and totals for each library of a library system. A third sheet of the data set 165 can include information about books, such as how many copies are available at a library, average time a book is checked out, among other information. The mapping module 160 can generate associations between library card holders, books checked out, among other values of the data set 165, based on identified tables, entities, and types of the data set 165. These examples depicted herein are meant to be exemplary and non-limiting. Associations among the data set 165 can be generated for any type of data set 165 and in any quantity.

The mapping module 160 can generate databases or tables based on the generated associations. The mapping module can generate relational databases, relational tables, object-oriented database, or graph databases based on the generated associations. For example, the mapping module 160 can generate a database based on MySQL, SQLite, Oracle Database, or other relational database or object-oriented management systems. The mapping module 160 can store the relational databases and tables in the data repository 115, as a part of the data set 165, or in an external storage, such as associated with the client device 125. The mapping module can generate relational databases using a relational model, such as a one-to-many model, one-to-one model, or a many-to-many model.

The data processing system 105 can utilize a sixth ensemble 170F to validate the identified qualities of the data set 165. The identified qualities of the data set 165 can include the layout, the headers, the report type, the data type, the vendor type, or the sections, among others. The sixth ensemble 170F can be referred to as a validation ensemble. The validation ensemble 170F can validate the identified qualities based on the labels or classifications assigned to the values of the data set 165. In some cases, the validation ensemble 170F can validate the tables. For example, the validation ensemble 170F can validate the headers of the tables using, for example, a machine learning model such as Random Forest. The validation ensemble 170F ca validate the headers by assigning a label to the values associated with a header based on the identified header and the data associated with the header.

The validation ensemble 170F can include rules to apply to each label associated with the values of the data set 165. For example, a value of the data set can include or be associated with the label "social security number." Using the rules, the validation ensemble 170F can determine that a value including a label "social security number" must possess a nine digit string of numbers. As an illustrative example, a value of the data set can be associated with a classification "tax info." In this illustrative example, the validation ensemble 170F can use a rule indicating that text of the value must relate to tax info. For example, the text of the value must include at least one of a marital status, income bracket, number of dependents, among others. The rules presented herein for the validation ensemble are exemplary and can extend to any other rules for determining the validity of a value of the data set 165 based on the labels assigned to the value by the components of the data processing system 105.

In some cases, the validation ensemble 170F can determine that a value of the data set 165 is invalid. The validation ensemble 170F can determine that the value is invalid if the value does not satisfy a rule associated with a label of the value. For example, the validation ensemble 170F can determine that a value including a label "social security number" must possess a nine digit string of numbers. The validation ensemble 170F can determine that the value associated with the "social security number" label is or includes a text string. The validation ensemble 170F can determine that the value including the text string is invalid because it does not satisfy the rule associated with the "social security number" label. Upon a determination that a value of the data set 165 is invalid, the validation ensemble 170F can present the invalid values via a display device of the data processing system 105 or the client device 125. For example, the validation ensemble 170F can mark, color code, highlight, list, or otherwise provide an indication via the display device of the invalid models. With the presentation of the invalid values, the data processing system 105 can accept input (via the display device of the data processing system 105 or the client device 125) to correct the invalid values. The data processing system 105 can accept a text, vocal, pictorial, or other input to replace the invalid value. For example, an operator of the system can enter (via a user interface coupled with the display device) a typed value of "123-45-6789" to replace an invalid value of "123-45."

The validation ensemble 170F can validate the values of the data set 165 at any time. The validation ensemble 170F can validate the values of the data set 165 subsequent to, prior to, or concurrently with the operations of the data handler 130, the ensemble controller 135, the data parser 140, the type identifier 145, the section detection module 150, the page classification module 155, the mapping module 160, or the format transformer 185. The validation ensemble 170F can validate the data set 165 based on a threshold. The validation ensemble 170F can include one or more thresholds for validation. For example, the validation ensemble 170F can validate the headers for each sheet to categorize each header. Each selection of a category for each header by the validation ensemble 170F can be based on a threshold. For example, the selection of a classification or category of "master data" can be based in part by a threshold number of values associated with the header being associated with "master data."

In some cases, a classification or category can already be assigned to a value of the data set 165 by others of the ensembles 170. The validation ensemble 170F can validate these classifications by assigning further classifications, such as "keep," "drop" or "not sure." For example, the validation ensemble 170F can determine that a classification of "header" for a value of the data set 165 does not satisfy a threshold of the validation ensemble 170F. The validation ensemble 170F can assign a classification or label of "drop" to the value. The label of "drop" can cause the value to be de-classified as a header. The label of "drop" can cause the value to be presented to an operator of the system for removal or manual classification. The validation ensemble 170F can assign a classification of "keep" to the value. The label of "keep" can cause the value to be validated by the validation ensemble 170F. The validation ensemble 170F can assign a classification of "not sure" to the value. The label of "not sure" can cause the value to be flagged or otherwise marked for further evaluation. Further evaluation can include a manual check of the classification of the value, or further processing by one or more of the ensembles 170.

The data processing system 105 can include a format transformer 185 designed, constructed and operational to transform the data set into a format of a second file type using a fourth ensemble 170D. The format transformer 185 can be any combination of hardware and software to generate a second file type for the data set 165 based on the identified types, sheet classifications, tables, entities, among others. Through transforming the data set 165, the format transformer 185 can generate a second file type including the data set 165 by mapping the identified and extracted facets of the data set 165 (e.g., the types, sheet classifications, tables, or entities, among others) to pre-defined categories.

The format transformer 185 can standardize the data set 165 from an unknown format to a known or defined format. The format transformer 185 can rearrange the data set 165 or assign labels based on a mapping for data standardization. A mapping for data standardization can be a data structure which provides, lists, or generates analogous labels and arrangements for the data set 165 to be transformed into the second file type or format. In this manner, the format transformer can process the identified and extracted values of the data set 165 by mapping the data set 165 into a known format or type for the electronic transaction system, thereby standardizing the data.

The format transformer 185 can arrange values of the data set 165, based on the identified facets of the data set 165, into a known format for use by the electronic transaction system. For example, a value identified as a "birth date" can be arranged as "Feb. 1, 2000." However, the electronic transaction system can be formatted or arranged to accept birth dates in another form, such as "Jan. 2, 2000." The format transformer 185 can rearrange values into the format accepted by the electronic transaction system. The format transformer 185 can assign pre-defined labels to the identified values based on labels or classifications assigned to the values by the ensembles 170. For example, the page classification module 155 can identify or assign a label of "balances" to a sheet of the data set 165. The format transformer 185 can reassign or assign an additional label to the sheet, based on the identified header from the page classification module 155. In this illustrative example, the format transformer 185 can assign an additional label of "EMPLOYEE_STATUS" to the sheet. By mapping the data set 165, the format transformer 185 can create a vendor-agnostic data set 165. The mapping can remove identifiers of the vendor or the source 110 from which the data set 165 was transmitted by assigning labels and arrangements for use in the electronic transaction system on the client device 125.

The format transformer 185 can, using the mapped values, produce a file in the second file type. The file can include the data set 165 mapped for use in the electronic transaction system. The format transformer 185 can generate a file for presentation on the client device 125. For example, the format transformer 185 can generate a JSON second file type from a data set 165 received in a PDF first file type. The JSON second file type can include the data set 165 with its values identified, extracted, and mapped for use in the electronic transaction system. The second file type can have no identifiers of the source 110 from which it was originally transmitted, or can have no identifiers associated with the vendor type identified in the data set 165. The second file can include the associations generated by the mapping module 160. The format transformer 185 can present the transformed data set 165 for integration into the electronic transaction system. For example, the format transformer 185 can present the transformed data set 165 on a screen or interface of the client device 125. The format transformer 185 can present the mapping on the screen or interface of the client device 125. The mapping can include the values of the data set 165, the identified and extracted facets (e.g., the headers, sections, tables, entities, data types, report type, vendor type, or layout), labels assigned to the data set 165, associations of the data set 165, relational databases generated based on the associations, or rearrangements of the data set 165, among others.

Through these systems and methods, the data processing system 105 can receive a data set 165 in an unknown type from any source 110 and identify facets of the values of the data set 165. The data processing system can remove junk values from the data set 165 and can identify a type of the data set 165. From the type and the data set 165, the data processing system 105 can extract sections and page classifications. The data processing system can generate associations of the data set 165 and map the data set 165 to a format and file type processable by an electronic transaction system. The systems and methods depicted herein are able to increase efficiency of onboarding between different systems. Furthermore, this technical solution can reduce computational power required for maintaining compatibility between the electronic transaction system and a multitude of legacy systems.

Figure 2A:
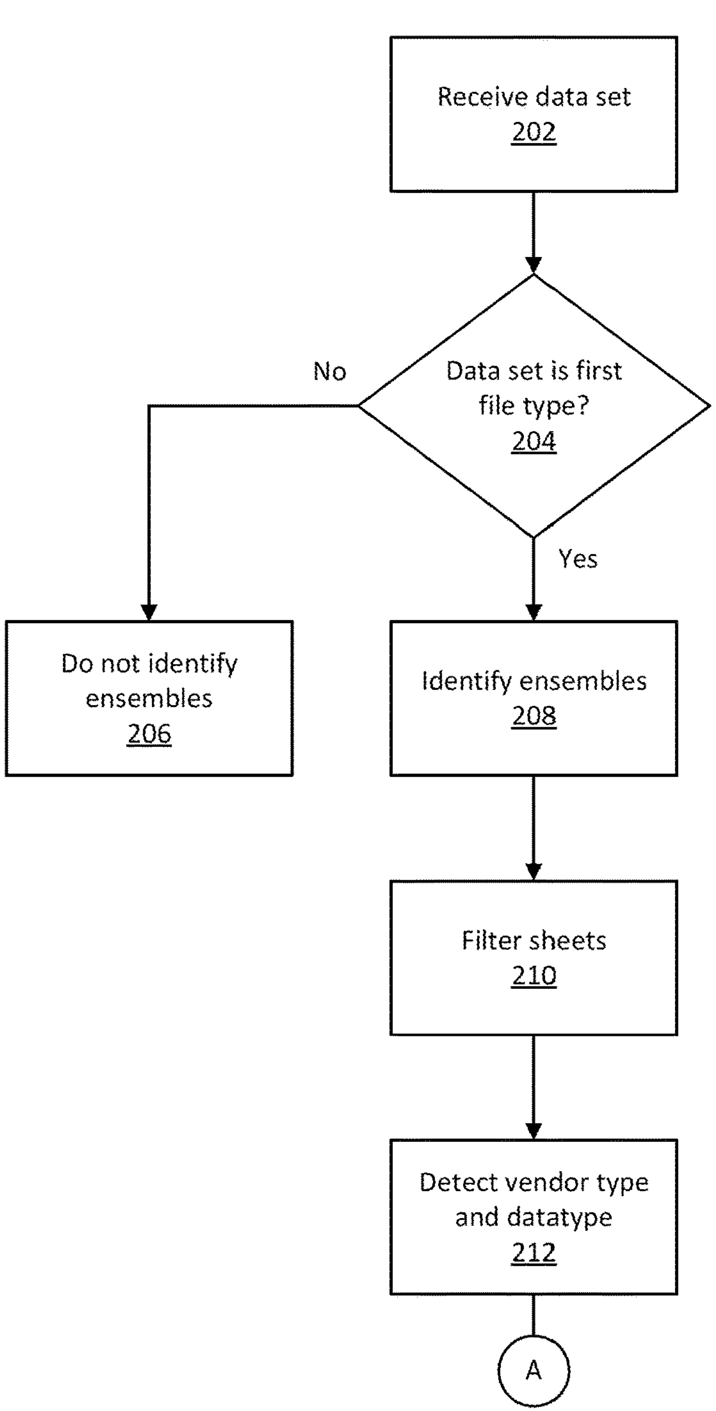
FIGS. 2A-2B depict an example method for digitizing data via custom integrated machine learning ensembles.
Figure 2B:
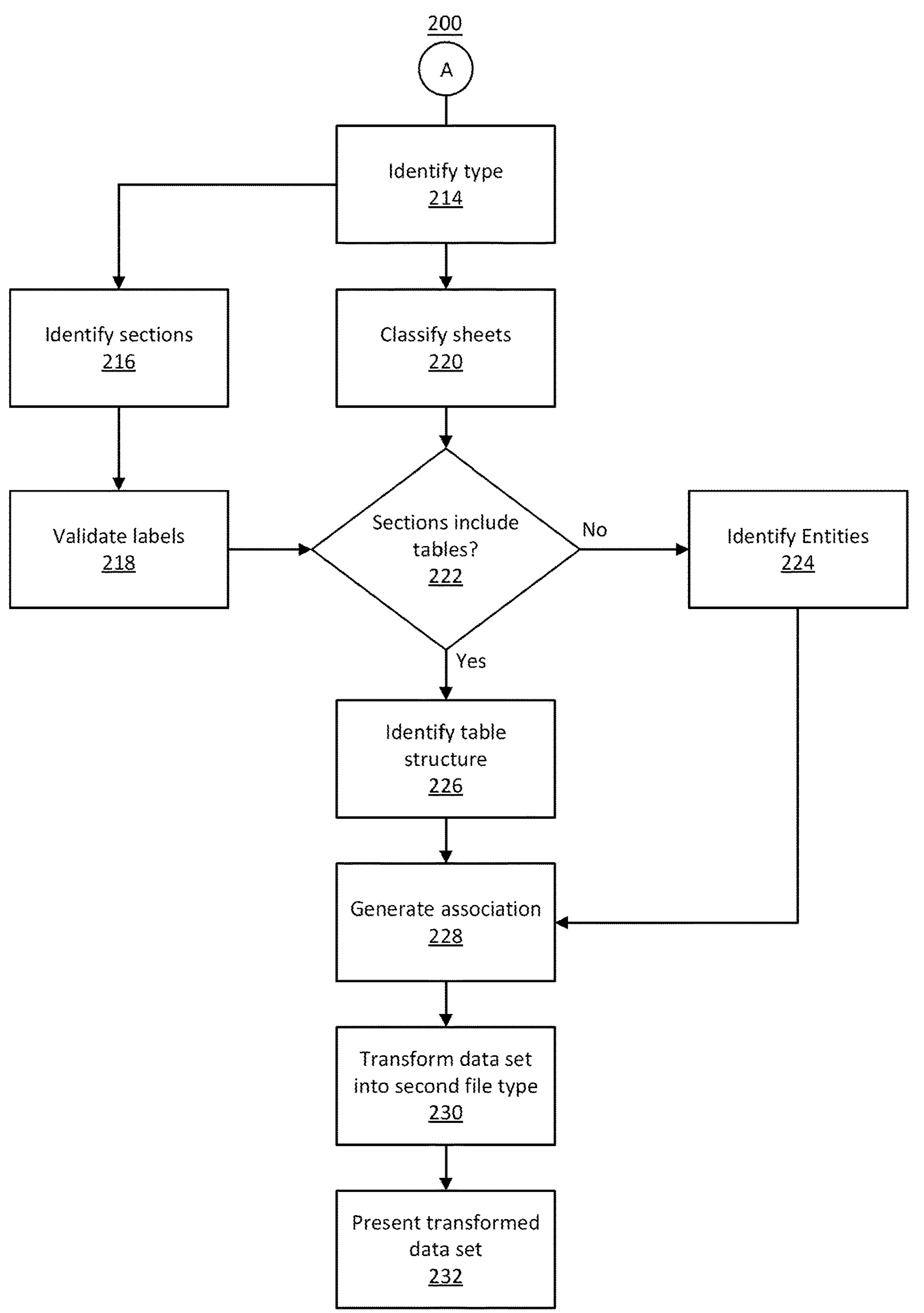

FIGS. 2A-2B depict an example method for digitizing data via custom integrated machine learning ensembles. The method 200 can be performed by one or more systems or components depicted in FIG. 1, FIG. 8, or FIG. 9, including, for example, a data processing system. At ACT 202, the method 200 can include the data processing system receiving a data set. The data processing system can receive the data set from one or more sources. The data processing system can receive the data set at any time and in any format or type of data set. The data processing system can receive the data set over a network, a hard wired connection, or from operator input. The data set can be sent as an electronic file. The data set can include or be subdivided into sheets. The data set can include values, where each value is a portion of the data set. Each sheet of the data set can include one or more values.

The data processing system can receive the data set in real-time, via a data stream, periodically (e.g., every 1 second, 2 seconds, 3 seconds, 5 seconds, 10 seconds, 15 seconds, 20 seconds, 30 seconds, 60 seconds, or other time interval). The data processing system can request the data set from the sources, such as via a poll, query, ping, or fetch operation. The data processing system can request the data set responsive to a condition or event, such as detecting a new source connected to the network, a change in an ensemble of the data processing system, or a change in the electronic transaction system.

At decision block 204, the data processing system can determine if the data set is in a first file type. The data set can be received as an electronic file, such as a PDF, JSON, CSV, or DOCX. The data processing system can determine if the data set is in a file type specified by the data processing system. For example, the first file type can be a PDF file type and the data processing system can determine if the received data set is a PDF file type. If the data set is not the first file type, the data processing system can proceed to ACT 206. At ACT 206, the data processing system does not identify the ensembles. The data processing system can not identify the ensembles responsive to receiving a data set that is not in the first file type. If the data set is the first file type, the data processing system can proceed to ACT 208.

At ACT 208, the data processing system can identify the ensembles. The ensembles can be a set of machine learning ensembles. Each ensemble can include one or more machine learning models. Each model of each machine learning ensemble can be trained using a second data set to determine an outcome or output from the data set. Each ensemble can determine an outcome or output from the outcomes of their respective machine learning models. In some cases, the ensembles can take as input one or more outcomes of another ensemble or machine learning model. Identifying the ensembles can refer to the data processing system retrieving the ensembles from memory for operation on the data set. The data processing system can retrieve the ensembles sequentially or concurrently.

At ACT 210, the data processing system can filter the sheets. The data processing system can filter the sheets using one or more of the machine learning ensembles. Filtering the sheets can include cleaning or scrubbing the data set to identify blank, null, erroneous, or junk values and sheets of the data set. The data processing system can filter the sheets to remove or hide those values and sheets of the data set. The data processing system can filter the data set to remove or hide duplicate values and sheets of the data set. In this manner, the data processing system can curate the data set to include values and sheets which are not identified as junk, blank, null, erroneous, or duplicates.

At ACT 212, the data processing system can detect types of the data set. The data processing system can detect, determine, or identify a vendor type, data type, or other type of the data set. The vendor type can be a vendor, client, or company associated with the source from which the data set was transmitted. The data set can include an indication of the vendor type, such as a specific format, an image such as an insignia or logo, or a text string or other value related to the vendor. The vendor type can indicate a format of the dat. For example, a first vendor can arrange a first data set differently than a second vendor, and a second data set from the first vendor can follow the same or a similar arrangement of the first data set.

The data processing system can detect, determine, or identify a data type of the data set. A data type can include a pre-defined label corresponding to a value of the data set. For example, a data type can be master data, indicative data, balance data, tax data, employee data, among others. Each data type can have one or more labels corresponding to it. For example, an employee data data type can include the labels "EMPLOYEE DATA" or the labels "DATE OF BIRTH," "GENDER," "HOME ADDRESS." Each label can be subdivided and can include more or other labels. For example, the label "HOME ADDRESS" can include the labels "STREET," and "TOWN." In this manner, each value of the data set can have an assigned data type based on the outcome of an ensemble operating to identify the data type.

Referring now to FIG. 2B, at ACT 214, the data processing system can identify a type. The type can be a report type. The data set can be in one or more report types. The report type can be associated with the values of the data set. The report type can be associated with text, images, or other values. For example, the report type can indicate that the data set is a part of a payroll register, a time keeping report, an accounting register, an employee database, The report type associated with a data set can be one or more of a set of pre-defined report types. The pre-defined report types can include Payroll Register, Payroll Register with YTD, Payroll Register with ER Taxes and Payroll Journal, among others. The report type can include a layout or arrangement of the values. The data set can include one or more layouts. The layout can depict an overall view or display of the data set for a particular sheet. The layout can be the arrangement of the values of the data set within each sheet, or the arrangement of the sheets themselves. For example, the layout of a first sheet of the data set can arrange values of the data set differently than the layout of a second sheet of the data set. The arrangement or layout can refer to where the values are placed in relation to other values, the text or digits of each value, the labels associated with each value, or the data types. The report type can indicate the values of the data set, such as text contained in the values or an arrangement of the values. For example, a text-based value can indicate the report type for the data set is a Payroll Register.

The data processing system can identify the report type based on the vendor type, data type, or the data set. The data processing system can determine a report type for each sheet of the data set, or the data processing system can determine the report type for the entire data set. The data processing system can identify a location or arrangement of the values related to the vendor type and the data type. Based on relative locations of the types of the data set, the sheets, and the data set, the data processing system can utilize one or more of the identified ensembles to produce an outcome relating the values of the data set to identify the one or more report types. The data processing system can determine the report type by parsing text of the data set. For example, the data processing system can use one or more machine learning models to analyze text-based values of the data set for common words, syntax, font formatting, or sentence structure, among others. Based on the analysis by the data processing system using the one or more models, the data processing system can identify the report type.

At ACT 216, the data processing system can identify sections. The sections can include a subset of the data set. For example, a section can include all or some of the values of the data set. A section can include values corresponding to a data type, values arranged in a predefined order, values corresponding to a header or other value, among others. The sections can correspond to locations or arrangements of the values within each sheet of the data set. A section can located entirely on a sheet of the data set, or a section can expand over multiple sheets of the data set. Identifying the sections can refer to identifying subsets of the layout of the data set for each sheet according to at least the report type. The data processing system can identify the sections based on the report type, data type, vendor type, the values of the data set (such as images, text, or other values) or the sheets.

The data processing system can use one or more machine learning models to identify the sections for each sheet of the data set based on the report type. The data processing system can parse the values of the data set to identify the sections. For example, data processing system can use image recognition to analyze the data set for arrangements of different values related to sections.

At ACT 218, the data processing system can validate labels. The data processing system can validate labels to check that the subsets of data labelled as sections are sections. The data processing system can validate the labels using one or more machine learning models to compare values of the sections for similarity to values associated with a section. The data processing system can validate the labels using the one or more machine learning models to compare a layout of the values or the data set to layouts associated with sections.

At ACT 220, the data processing system can classify sheets. The data processing system can classify each sheet of the data set as one or more of a set of pre-defined labels. The data processing system can use one or more machine learning models to determine that a sheet belongs to a classification or label. In some cases, the data processing system can determine, based on text-based values of the data set, whether a threshold number of values of a sheet correspond to one or more of the pre-defined label categories. For example, the data processing system can determine that a sheet of the data set can be classified as "balances" if the data processing system determines, using the one or more machine learning models, that a threshold number of values correspond to the classifier "balances." For example, different texts can correspond to or indicate a "balance" sheet, such as "deductions" "net" or "checking." Likewise, different strings of text can correspond to or indicate a "totals" sheet, such as "total," "amount," or "sum," among others.

The ACTS 216-220 can be performed by the data processing system in parallel. In some cases, the data processing system can classify the sheets (as in ACT 220) while identifying the sections (as in ACT 216). The data processing system can take as input the outcomes (e.g., sections and classified sheets). For example, the data processing system can use the classified sheets as input to identify the sections using one or more machine learning models.

At decision block 222, the data processing system can identify tables from the sections. The data processing system can identify or classify one or more sections as tables by analyzing, using one or more machine learning models, the sections for arrangements of the values corresponding to tables. For example, the data processing system can determine if a section includes rows and columns. Rows and columns can be rows and columns of values of the data set for each sheet. A row can include related values of the data set arranged horizontally within a sheet of the data set. A column can include related values of the data set arranged vertically within a sheet of the data set. One or more rows and columns arranged together can create a table. Entries or values in a table can be denoted by a position indicated by labels associated with the rows and columns. For example, a first row can be labelled "A" and a first column can be labelled "1." A value of the table can be depicted or located by an identifier "A1," indicating the row "A" and the column "1."

The data processing system can identify the tables responsive to at least the identification of the sections in ACT 216. The data processing system can identify tables for each sheet, or just for the sheets with identified sections. The data processing system can identify the rows and columns using one or more ensembles of the identified ensembles. The data processing system can use the layout, data type, vendor type, values or other aspects of the data set as inputs to the one or more ensembles to identify the tables. If the data processing system can identify a table for one or more sheets of the data set, the data processing system can proceed to ACT 226. If the data processing system can not identify a table for one or more sheet of the data set, the data processing system can proceed to ACT 224. The data processing system can perform both acts 226 and 224, in the event that one or more sheets has tables and one or more sheets does not have tables.

At ACT 226, the data processing system can identify the table structure. The data processing system can identify the table structure based on the identified rows or columns of the table. The data processing system can identify the table structure based on values of the tables, such as text strings or images. The data processing system can identify the table structure based on formatting of the table, such as bolded or dashed lines of the table. The data processing system can assign classifications or labels to the tables based on the values, data type, report type, rows, or columns of the tables. Identifying the table structure can refer to classifying the table as a type such as employee info or company info.

At ACT 224, the data processing system can identify entities. The entities can be non-table sections. The entities can be referred to as key-value pairs. In some cases, an entity can include two values, wherein a first value includes a label and a second value includes data or information. For example, a key-value pair can include the label "NAME" and the information "JOHN SMITH." For example, a key-value pair can include the label "EMPLOYEE ID" and the information "123456." In some cases, both entities can tables can be included within the same sheet. In some cases, entities can be included within a table. In some cases, entities are separate from the tables of a sheet.

The data processing system can use one or more machine learning models, operating in an ensemble, to identify the entities. In some cases, the ensemble can include one or more machine learning models to recognize, identify, or otherwise determine that a section is an entity by identifying a paired pattern of the text of each section. For example, the data processing system can parse text-based values of the data set in each identified section to identify a pattern including two values which are related. The two values can be related in content, length, location, proximity. In some cases, the data processing system can parse the values for paired pattern including formatting of the values. For example, the data processing system can identify a bolded text-based value aligned with a non-bolded text-based value as a paired pattern.

At ACT 228, the data processing system can generate associations. The data processing system can generate associations among the data set. The data processing system can generate associations among and between sheets of the data set, values of the data set, sections of the data set, or types of the data set, among others. For example, the data processing system can generate an association between a value and a sheet, or the data processing system can generate an association between values of a sheet or different sheets.

The associations can be or include relationships among the data set. The relationships or associations can be operations or mappings between the data set. For example, the data processing system can generate an operation relating several values of the data set to one or more tables of the data set. For example, the data processing system can generate a mapping wherein a change in a value associated with the mapping can elicit a change in one or more other values of the data set. In this manner, the data processing system can identify relationships among the data processing system can generate operations or mappings which describe the behavior of the relationships.

At ACT 230, the data processing system can transform the data set into a second file type. The data processing system can transform the data set into the second file type using one or more machine learning ensembles. The data processing system can use a mapping generated by the data processing system with the data set, values, sections, or types, among others, to transform the data set. Transforming the data set can refer to the data processing system assigning a classification or arrangement to each value of the data set to enable the data set to be integrated into an electronic transaction system.

Transforming the data set can include generating a file of the second file type from the data set based on the mapping. The file of the second file type can include the data set with its corresponding classifications. The generated file can include the data set as processed by the data processing system. The generated file can include the mapping of the data set from the first format to the second format.

At ACT 232, the data processing system can present the transformed data set. The data processing system can present the transformed data set through an interface associated with the data processing system, an interface of a client device, or an interface of a source. The data processing system can generate instructions for presentation of the generated file to present the transformed data set. For example, the data processing system can transmit the generated file to the client device to present the transformed data set. The transformed data set can be presented for integration into an electronic transaction system.

Figure 3:
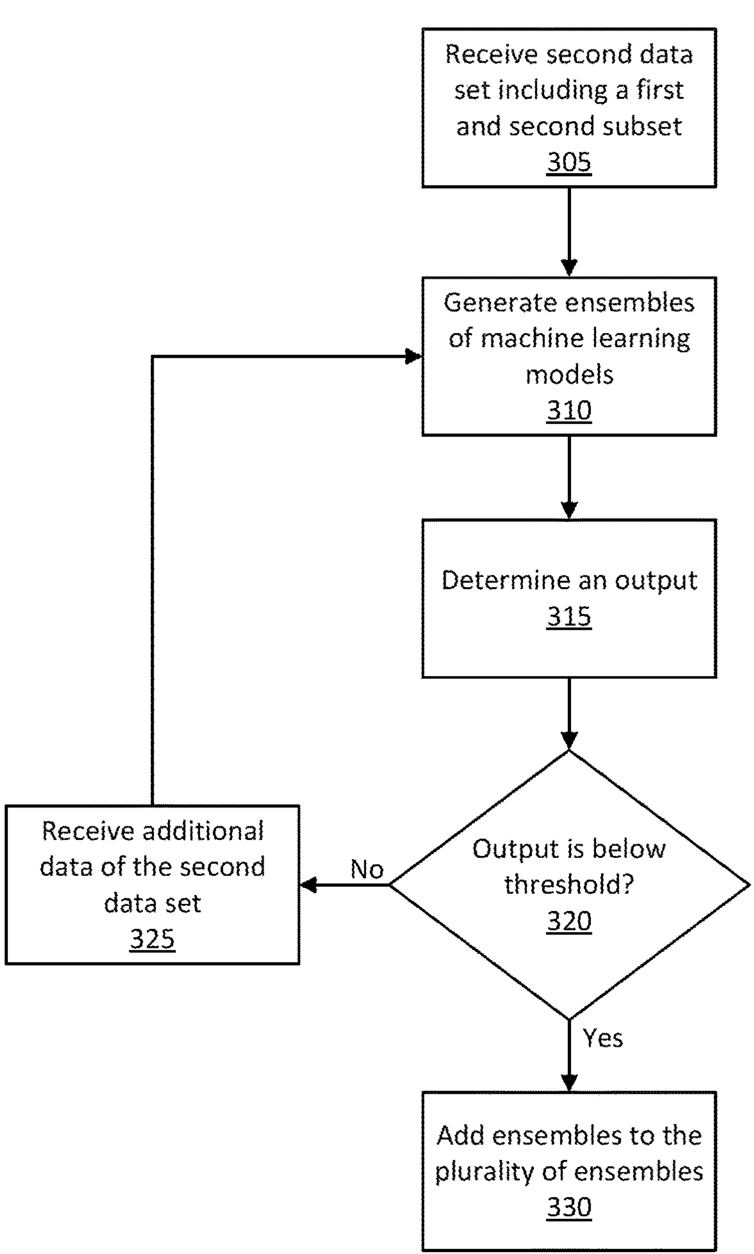
FIG. 3 depicts an example method for generating custom integrated ensembles of machine learning models for digitizing data.

FIG. 3 depicts a method 300 for generating custom integrated ensembles of machine learning models for digitizing data. The method 300 can be performed by one or more systems or components depicted in FIG. 1, FIG. 8, or FIG. 9, including, for example, a data processing system. At ACT 305, the data processing system can receive a second data set including a first and second subset. The data processing system can receive a second data set from one or more sources. The data processing system can divide the second data set into one or more subsets. The data processing system can divide the second data set into a set of test data and a set of training data.

At ACT 310, the data processing system can generate ensembles of machine learning models. The data processing system can generate the ensembles of machine learning models by training one or more machine learning models for each ensemble. The data processing system can train the models by using a subset of the second data set. For example, the data processing system can use the training data as inputs for one or more of the machine learning models. The data processing system can create ensembles of the trained machine learning models. Each ensemble of the trained ensembles can include different sets of the machine learning models. The ensembles can produce different outcomes. The ensembles and their machine learning models can be trained on different subsets of the training data. The ensembles and their machine learning models can be trained by an outcome of one or more of the ensembles and their machine learning models. The data processing system can store the trained ensembles in memory.

At ACT 315, the data processing system can determine an output. The data processing system can determine an output (e.g., outcome) of the machine learning models or the ensembles of the machine learning models. The data processing system can determine an output of the ensembles or models using the second data set. For example, the data processing system can provide the test data as input to the ensembles or models. The data processing system can determine an output for each model of an ensemble, some models of an ensemble, or an output of the ensemble. The output of the ensemble can be determined from the outputs of one or more of the models contained within the ensemble. The output of the models can be determined from the inputs (e.g., the test data) given to the models. The models and ensembles can generate or create outputs based at least on the training data. The models and ensembles can generate or create one or more outputs. A model or ensemble can generate an output based on an output of another model or ensemble.

At decision block 320, the data processing system can determine if the output is below a threshold. The data processing system can compare the outputs to a threshold. The threshold can be an error score. The error score can indicate a maximum error allowable by one or more of the machine learning models or ensembles. Each model or ensemble can have a different error score. The output being below a threshold can refer to an error score of the model or ensemble being below the threshold error score. The error score of the model or ensemble can be determined as a ratio of "correct" outputs (e.g., outputs generated by the model or ensemble correlating to a known output of the test data) to total outputs, a ratio of "incorrect" outputs (e.g., outputs generated by the model or ensemble that do not correlate to a known output of the test data), or a mean square error of the outputs, among others. The data processing system can establish a threshold error score for the models and ensembles. If the output of a model or ensemble exceeds the threshold error score, the data processing system can proceed to ACT 325.

At ACT 325, the data processing system can receive additional data of the second data set. The data processing system can receive additional data responsive to the output of a model or ensemble exceeding or equaling the threshold. The data processing system can prompt, query, or request additional data from the source. The data processing system can aggregate additional data from the source to create the additional data of the second data set. The additional data of the second data set can be additional data aggregated over a period of time or a new (e.g., a third) data set. Upon receiving the additional data, the data processing system can generate ensembles and models using the additional data in ACT 310.

At ACT 330, the data processing system can add the ensembles to the plurality of ensembles. The data processing system can add the ensembles to the plurality of ensembles responsive to the output of the ensembles and models being below the threshold. In some cases, the data processing system can add some ensembles and models which are below the threshold, and can not add some ensembles and models which are not below the threshold. Adding the ensembles to the plurality of ensembles can include updating a set of existing ensembles to include the generated ensembles with outputs below the threshold. The ensembles can be stored in a memory of the data processing system for access by the data processing system.

Figure 4:
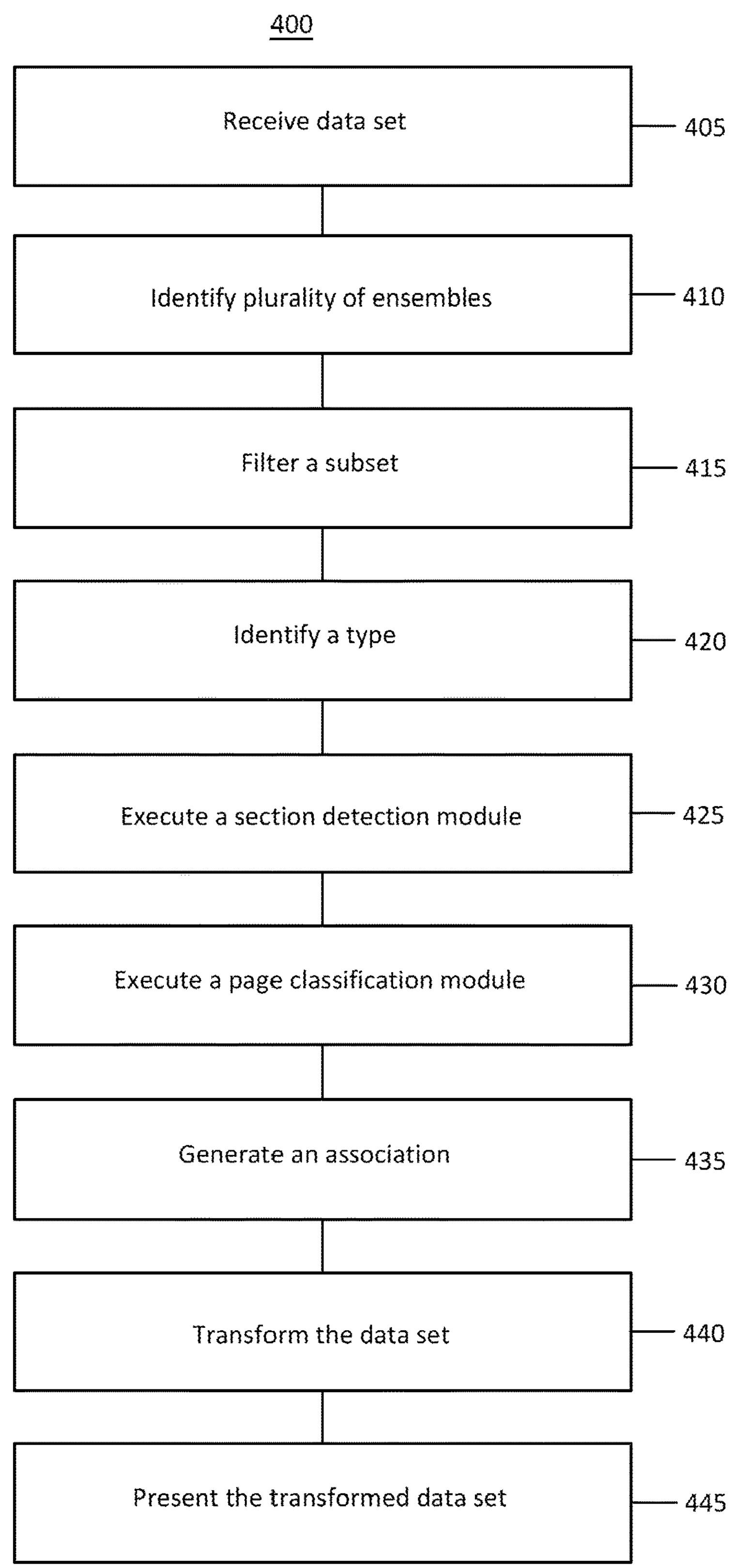
FIG. 4 depicts an example method for digitizing data via custom integrated machine learning ensembles.
Figure 8:
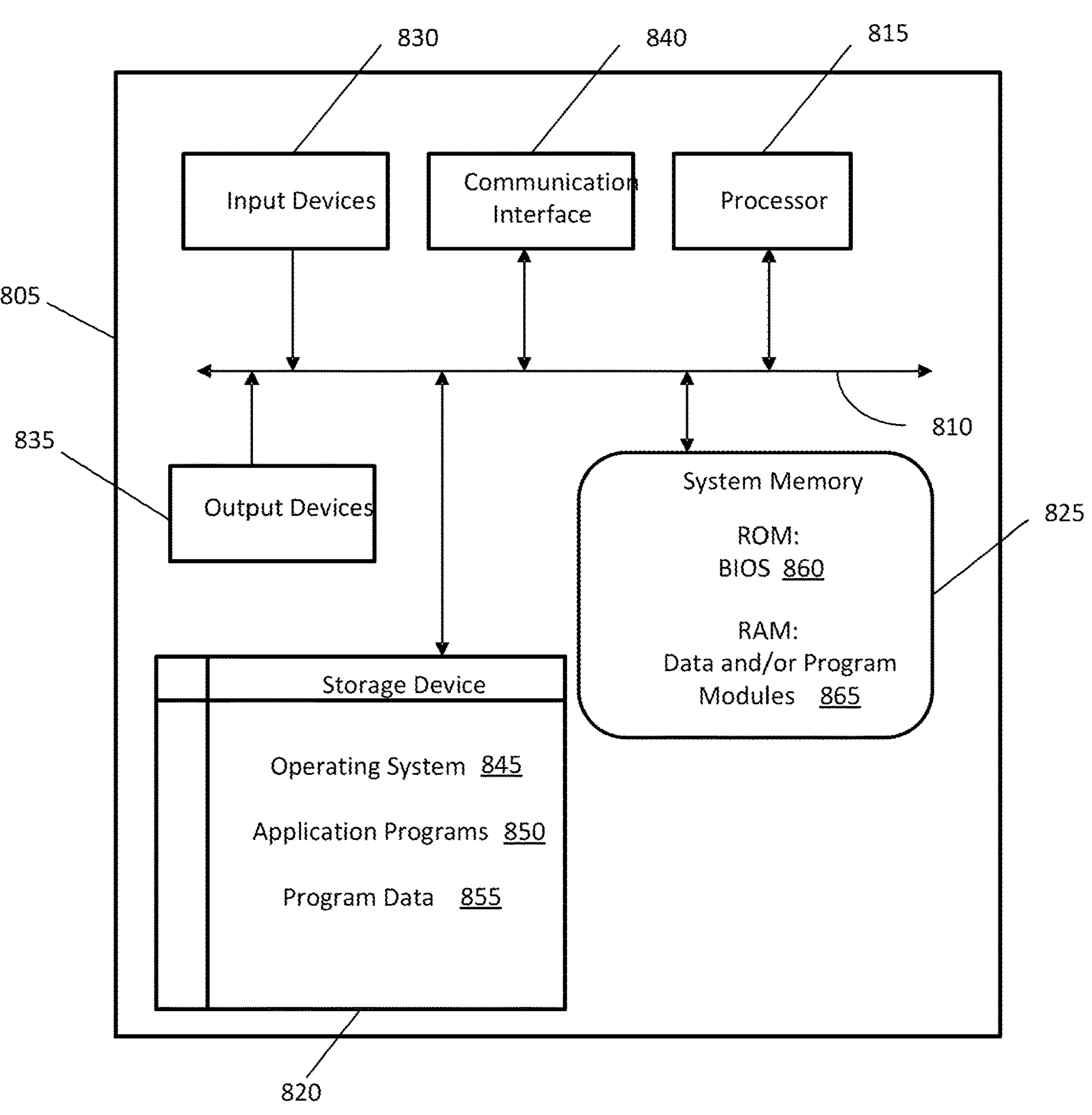
FIG. 8 depicts an illustrative architecture of a computing system implemented in embodiments of the present disclosure.
Figure 9:
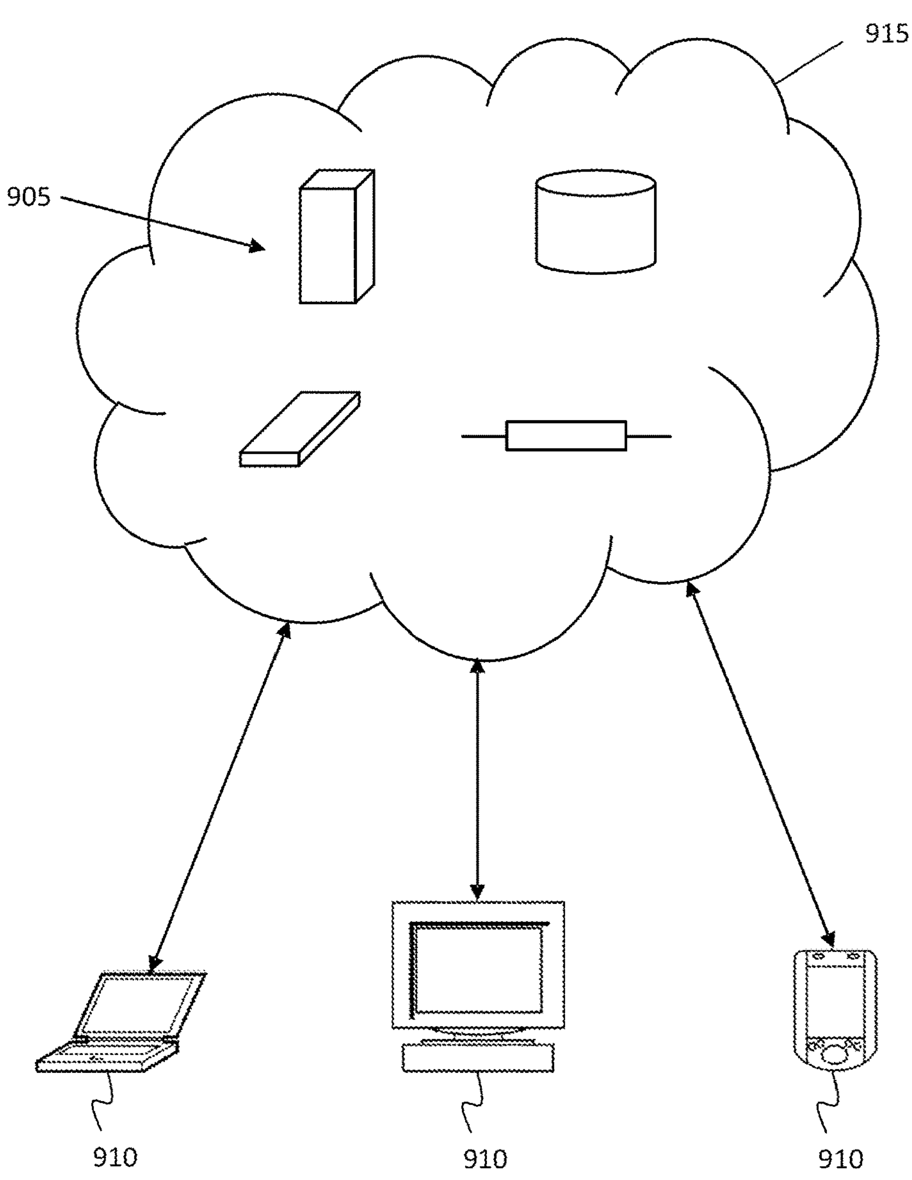
FIG. 9 shows an exemplary cloud computing environment in accordance with aspects of the present disclosure.

FIG. 4 depicts a method 400 for digitizing data via custom integrated machine learning ensembles. The method 400 can be performed by one or more systems or components depicted in FIG. 1. FIG. 8, or FIG. 9, including, for example, a data processing system. At ACT 405, the data processing system can receive a data set. The data set can include values arranged within sheets of the data set. The data set can be received from one or more sources.

At ACT 410, the data processing system can identify a plurality of ensembles. Identifying a plurality of ensembles can include identifying the ensembles comprising one or more machine learning models. Each ensemble can determine an outcome based on one or more outcomes of the machine learning models comprised therein. Identifying the ensembles can include the data processing system accessing the ensembles to provide the data set as input. Identifying the ensembles can include the data processing system identifying ensembles to operate on the data set based on the data set.

At ACT 415, the data processing system can filter a subset. The data processing system can filter, curate, or clean a subset of the data set. The subset can be a subset of values or sheets of the data set. The data processing system can filter the subset based on values contained within the subset. For example, the data processing system can filter the data processing set for a subset which contains blank, junk, null, duplicate, erroneous, or other such values. For example, the data processing system can remove, delete, flag, or otherwise indicate a blank, junk, null, duplicate or erroneous value or sheet from the data set. The data processing system can identify the junk values using one or more of the ensembles. The data processing system can mark a value as junk or non junk, and the data processing system can remove the values marked as junk. A value can be marked as junk if the data processing system determines the value to be a duplicate (e.g., appearing more than once in a superfluous manner), erroneous (e.g., expressing nonsensical text or digits), blank, or other values not of use to the data processing system.

At ACT 420, the data processing system can identify a type. The data processing system can identify a type using one or more ensembles based on the data set. In some cases, the data processing system can evaluate values and sheets of the data set to determine a location of the values and sheets in relation to other values and sheets. In some cases, the data processing system can identify the type based on a data type or vendor type identified in the data set. For example, the data processing system can associate a report type with a vendor type. For example, the data processing system can identify text-based strings of values associated with a data type. For example, the data processing system can determine a report type from a location of values associated with a data type.

At ACT 425, the data processing system can execute a section detection module. The data processing system can execute a section detection module using one or more ensembles to identify, extract, and classify subsets of the data set based on the values of the data set, the data types, the vendor type, the report type, or an arrangement or layout of the data set. The data processing system can identify the sections for each sheet of the data set. The data processing system can classify the sections one of at least a table or an entity. At ACT 430, the data processing system can execute a page classification module. The data processing system can execute the page classification module using one or more ensembles based on the data set, the data types, the report type, or the vendor type. For example, the data processing system can evaluate the layout of the data and the data types of a sheet to determine a page classification associated with the sheet. The data processing system can classify the sheets using pre-defined labels. The data processing system can assign the labels or classifications for each sheet in a mapping of the data set.

At ACT 435, the data processing system can generate associations. The data processing system can generate associations between components of the data set, such as the sections, values, data type, report type, vendor type, or sheets. The data processing system can generate the associations based on at least the components of the data set, including classifications and labels assigned to the components by the data processing system. For example, the data processing system can generate an association between a table labelled "Balances" and a sheet labelled "Balances." The data processing system can generate an association between a value of the table labelled "Balances" and another value.

At ACT 440, the data processing system can transform the data set. The data processing system can transform the data set based on a mapping generated by the data processing system during execution of the different modules and ensembles. The data processing system can assign classifications or labels to each identified sections, sheet, value, or type of the data set to transform the data set from a first format received from the source to a second format processable by an electronic transaction system. The data processing system can generate or create an electronic file including the data set. The electronic file can include the transformed data set, the original data set, or the mapping. The electronic file can be in a second file type different than the first file type. The electronic file can include the data set in a second format different than the first format of the first file type.

At ACT 445, the data processing system can present the transformed data set. The data processing system can present the transformed data set via an interface coupled with the data processing system, an interface of a client device, or an interface of the source. The data processing system can transmit the electronic file for presentation of the transformed data set. The data processing system can present the transformed data set for integration into an electronic transaction system. For example, the electronic transaction system can be able to implement, download, or otherwise employ the electronic file containing the transformed data set.

Figure 5:
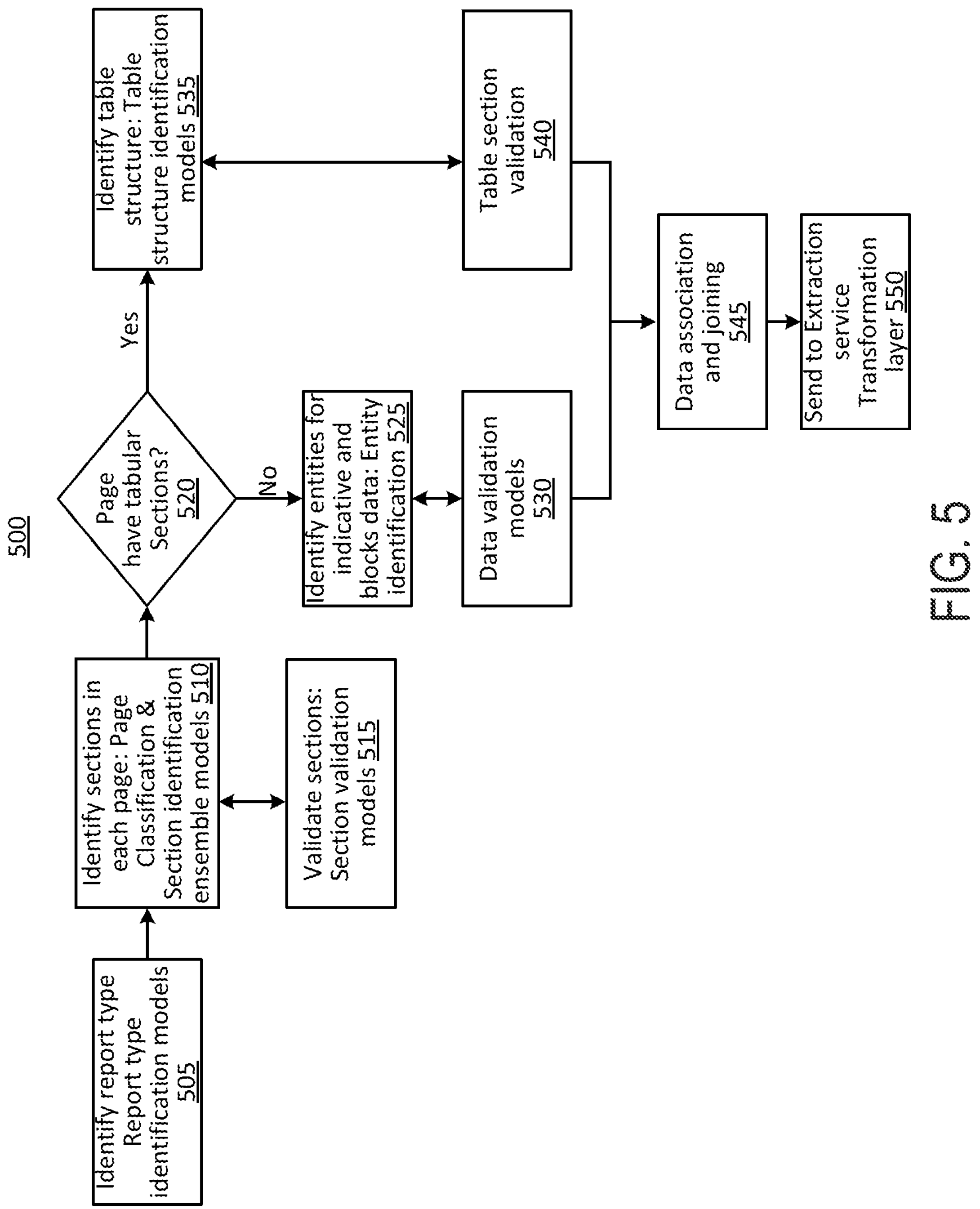
FIG. 5 depicts an example method for digitizing data via custom integrated machine learning ensembles.

FIG. 5 depicts a method 500 for digitizing data via custom integrated machine learning ensembles. The method 500 can be performed by one or more systems or components depicted in FIG. 1, FIG. 8, or FIG. 9, including, for example, a data processing system. At ACT 505, the data processing system can identify a report type. The data processing system can identify a report type of a received data set. The data set can be received from one or more sources and can be in one or more file types. At ACT 510, the data processing system can identify sections in each page. The data processing system can identify sections in each page using machine learning models to classify sheets of the data set and sections of the data set. At ACT 515, the data processing system can validate the sections. The data processing system can validate the sections using one or more machine learning models. The data processing system can validate the sections concurrently or in parallel with the identification of the sections during the ACT 510. At decision block 520, the data processing system can determine if a sheet of the data set has tabular sections. The data processing system can determine if sections of one or more sheets of the data set include tables. If a sheet includes tables, the data processing system can proceed to ACT 535. At ACT 535, the data processing system can identify the table structure. The data processing system can identify the table structure for each table of a sheet using one or more machine learning models. At ACT 540, the data processing system can validate the tables. For example, the data processing system can use one or more machine learning models to perform a check of a table label assigned to a section.

If the data processing system determines a sheet does not include tables, the data processing system can proceed to ACT 525. At ACT 525, the data processing system can identify entities for indicative and blocks data. The data processing system can identify entities of the sections. The entities can be sections which are not tables. The entities can include indicative and block data. Indicative data can be a key-value pair. Blocks data can include multiple key-value pairs. At ACT 530, the data processing system can validate the data. The data processing system can use one or more machine learning models to determine that a label assigned to an identified entity is correct based on a threshold of the values within the entity.

At ACT 545, the data processing system can generate associations and join the data set. The data processing system can determine relationships among the data set based on the values, tables, entities, page classifications, and report type, among others. At ACT 550, the data processing system can send the data set, including any associations, classifications, sections, data types, or other identified or generated components of the data set, to an extraction service for transformation. Transformation of the data set can include the data processing system creating a file in a second type for use with an electronic transaction system. For example, the data processing system can create a JSON file. The data processing system can create the JSON responsive to creating the associations at ACT 545. The data processing system can create an electronic file corresponding to a JSON file type that includes the transformed data set. The data processing system can transmit the electronic file to a client system for presentation or integration into an electronic transaction system.

Figure 6:
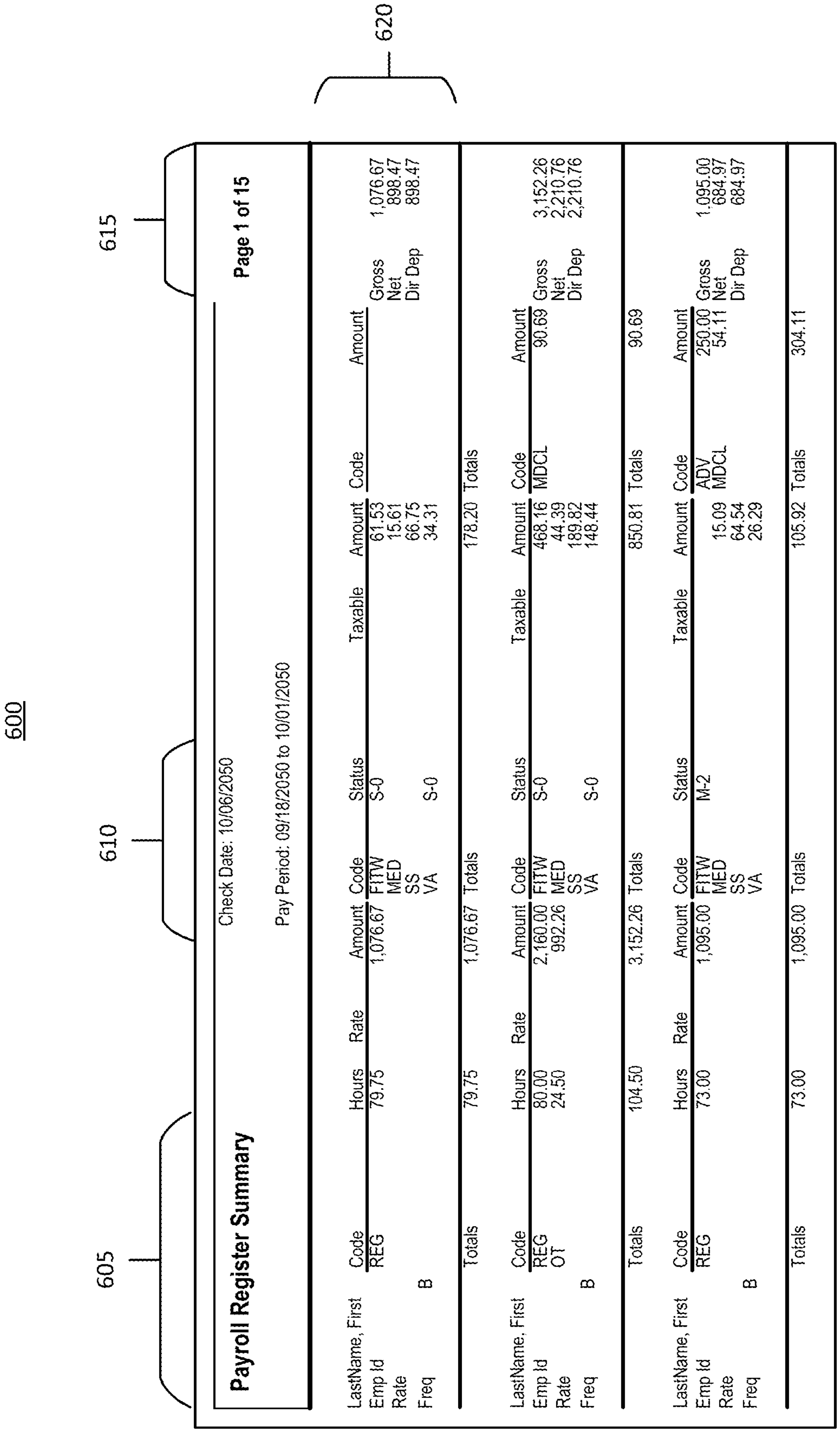
FIG. 6 depicts an example sheet in accordance with an illustrative embodiment.

FIG. 6 depicts an example sheet 600. The sheet 600 can include a data set with subsets 605-620. The subset 605 can include a value of the data set. The value of the subset 605 can indicate a report type of the sheet, such as "Payroll Register Summary." The subset 610 can include an entity of the data set. The entity can include two values, such as a label "Check Date" and information "Oct. 6, 2022." The subset 615 can include a value of the data set. The value of the data set can indicate a number of sheets of the data set. The value associated with the subset 615 can indicate a type of the data set, a section of the data set, among others. The subset 620 can include a table. The table of the subset 620 can include information relating to an employee, such as hours the employee has worked or an amount earned by the employee, among others.

FIG. 7 depicts an example table 700 associated with a data set. The example table 700 can be included in or displayed on one or more sheets of the data set. The example table 700 can include rows and columns. The example table 700 can include headers, such as "Description" or "Earnings." The example table 700 can be identified by a data processing system, such as by the section detection module 150 of the data processing system.

FIG. 8 is an illustrative architecture of a computing system 800 implemented in embodiments of the present disclosure. The computing system 800 is only one example of a suitable computing system and is not intended to suggest any limitation as to the scope of use or functionality of the disclosure. Also, computing system 800 should not be interpreted as having any dependency or requirement relating to any one or combination of components illustrated in computing system 800.

As shown in FIG. 8, computing system 800 includes a computing device 805. The computing device 805 can be resident on a network infrastructure such as within a cloud environment as shown in FIG. 9, or can be a separate independent computing device (e.g., a computing device of a third party service provider). The computing device 805 can include a bus 810, a processor 815, a storage device 820, a system memory (hardware device) 825, one or more input devices 830, one or more output devices 835, and a communication interface 840.

The bus 810 permits communication among the components of computing device 805. For example, bus 810 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 805.

The processor 815 can be one or more processors or microprocessors that include any processing circuitry operative to interpret and execute computer readable program instructions, such as program instructions for controlling the operation and performance of one or more of the various other components of computing device 805. In embodiments, processor 815 interprets and executes the processes, steps, functions, and/or operations of the present disclosure, which can be operatively implemented by the computer readable program instructions.

For example, processor 815 provides an enterprise-wide security approach with all stakeholders (e.g., Dev teams, leadership, CSO office, etc.) with a set of various security scanner types and information sources integrated into a single tool. In embodiments, the processor 815 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 815 also establishes a regular feedback mechanism, and can be used to develop a process for remediation timelines and priority including at risk vulnerabilities.

In embodiments, processor 815 can receive input signals from one or more input devices 830 and/or drive output signals through one or more output devices 835. The input devices 830 can be, for example, a keyboard, touch sensitive user interface (UI), etc., as is known to those of skill in the art such that no further description is required for a complete understanding of the present disclosure. The output devices 835 can be, for example, any display device, printer, etc., as is known to those of skill in the art such that no further description is required for a complete understanding of the present disclosure.

The storage device 820 can include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 805 in accordance with the different aspects of the present disclosure. In embodiments, storage device 820 can store operating system 845, application programs 850, and program data 855 in accordance with aspects of the present disclosure.

The system memory 825 can include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 860 (BIOS) including the basic routines that help to transfer information between the various other components of computing device 805, such as during start-up, can be stored in the ROM. Additionally, data and/or program modules 865, such as at least a portion of operating system 845, application programs 850, and/or program data 855, that are accessible to and/or presently being operated on by processor 815 can be contained in the RAM.

The communication interface 840 can include any transceiver-like mechanism (e.g., a network interface, a network adapter, a modem, or combinations thereof) that enables computing device 805 to communicate with remote devices or systems, such as a mobile device or other computing devices such as, for example, a server in a networked environment, e.g., cloud environment. For example, computing device 805 can be connected to remote devices or systems via one or more local area networks (LAN) and/or one or more wide area networks (WAN) using communication interface 840.

As discussed herein, computing system 800 can be configured to integrate different scanner types into a single workbench or tool. This allows developers and other team members a uniform approach to assessing security vulnerabilities in a code throughout the enterprise. In particular, computing device 805 can perform tasks (e.g., process, steps, methods and/or functionality) in response to processor 815 executing program instructions contained in a computer readable medium, such as system memory 825. The program instructions can be read into system memory 825 from another computer readable medium, such as data storage device 820, or from another device via the communication interface 840 or server within or outside of a cloud environment. In embodiments, an operator can interact with computing device 805 via the one or more input devices 830 and/or the one or more output devices 835 to facilitate performance of the tasks and/or realize the end results of such tasks in accordance with aspects of the present disclosure. In additional or alternative embodiments, hardwired circuitry can be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 9 shows an exemplary cloud computing environment 900 in accordance with aspects of the disclosure. In embodiments, one or more aspects, functions and/or processes described herein can be performed and/or provided via cloud computing environment 900. As depicted in FIG. 9, cloud computing environment 900 includes cloud resources 905 that are made available to client devices 910 via a network 915, such as the Internet. Cloud resources 905 can be on a single network or a distributed network. Cloud resources 905 can be distributed across multiple cloud computing systems and/or individual network enabled computing devices. Cloud resources 905 can include a variety of hardware and/or software computing resources, such as servers, databases, storage, networks, applications, and platforms that perform the functions provided herein including storing code, running scanner types and provided an integration of plural scanner types into a uniform and standardized application, e.g., display.

Client devices 910 can comprise any suitable type of network-enabled computing device, such as servers, desktop computers, laptop computers, handheld computers (e.g., smartphones, tablet computers), set top boxes, and network-enabled hard drives. Cloud resources 905 are typically provided and maintained by a service provider so that a client does not need to maintain resources on a local client device 910. In embodiments, cloud resources 905 can include one or more computing system 800 of FIG. 8 that is specifically adapted to perform one or more of the functions and/or processes described herein.

Cloud computing environment 900 can be configured such that cloud resources 905 provide computing resources to client devices 910 through a variety of service models, such as Software as a Service (SaaS), Platforms as a service (PaaS), Infrastructure as a Service (IaaS), and/or any other cloud service models. Cloud resources 905 can be configured, in some cases, to provide multiple service models to a client device 910. For example, cloud resources 905 can provide both SaaS and IaaS to a client device 910. Cloud resources 905 can be configured, in some cases, to provide different service models to different client devices 910. For example, cloud resources 905 can provide SaaS to a first client device 910 and PaaS to a second client device 910.

Cloud computing environment 900 can be configured such that cloud resources 905 provide computing resources to client devices 910 through a variety of deployment models, such as public, private, community, hybrid, and/or any other cloud deployment model. Cloud resources 905 can be configured, in some cases, to support multiple deployment models. For example, cloud resources 905 can provide one set of computing resources through a public deployment model and another set of computing resources through a private deployment model.

In embodiments, software and/or hardware that performs one or more of the aspects, functions and/or processes described herein can be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 905 can be configured to provide a variety of functionality that involves user interaction. Accordingly, a user interface (UI) can be provided for communicating with cloud resources 905 and/or performing tasks associated with cloud resources 905. The UI can be accessed via a client device 910 in communication with cloud resources 905. The UI can be configured to operate in a variety of client modes, including a fat client mode, a thin client mode, or a hybrid client mode, depending on the storage and processing capabilities of cloud resources 905 and/or client device 910. Therefore, a UI can be implemented as a standalone application operating at the client device in some embodiments. In other embodiments, a web browser-based portal can be used to provide the UI. Any other configuration to access cloud resources 905 can also be used in various implementations.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system, comprising:

one or more processors, coupled with memory, to:

receive a data set comprising sheets in a first file type from a plurality of sources, the data set in one of a plurality of formats corresponding to one or more of the plurality of sources;

identify a plurality of ensembles, each ensemble of the plurality of ensembles comprising one or more machine learning models and each ensemble to determine an outcome based on an outcome of each machine learning model of each respective ensemble;

identify, using a first ensemble of the plurality of ensembles, a type for each sheet of the data set based on a vendor type and the data set;

execute, using a second ensemble of the plurality of ensembles, a section detection module to identify sections for each sheet of the data set based on the respective type for each sheet and images and text within each sheet;

execute, using a third ensemble of the plurality of ensembles, a page classification module to identify classifications within each sheet based on the data set;

generate an association between the sections and the classifications for each type of each sheet of the data set;

transform, using a fourth ensemble of the plurality of ensembles based on the association, the sections, the classifications, and the type, the data set into a format of a second file type different from the plurality of formats; and provide, for render by a display device coupled with the one or more processors, the transformed data set for integration into an electronic transaction system.

2. The system of claim 1, comprising the one or more processors to:

receive a second data set comprising a first subset of data to be an input into the one or more machine learning models and a second subset of data to compare against an output of the one or more machine learning models;

generate, using the first subset of data, the plurality of ensembles, each ensemble of the plurality of ensembles comprising a subset of the one or more machine learning models and each ensemble to be generated sequentially; and determine, using the second subset of data, that each machine learning model of each ensemble of the plurality of ensembles is below a threshold error.

3. The system of claim 1, comprising the one or more processors to:

determine that an error of one or more ensembles of the plurality of ensembles is greater than or equal to a threshold error;

aggregate a second data set comprising a first subset of data to be an input into the one or more machine learning models and a second subset of data to compare against an output of the one or more machine learning models;

generate, using the first subset of data, a second plurality of ensembles for each ensemble of the plurality of ensembles with its error greater than or equal to the threshold error, each ensemble of the second plurality of ensembles comprising a subset of the one or more machine learning models;

determine, using the second subset of data, that each machine learning model of each ensemble of the second plurality of ensembles is below the threshold error; and replace the plurality of ensembles with the second plurality of ensembles for each ensemble of the plurality of ensembles determined to have its error greater than or equal to the threshold error.

4. The system of claim 1, comprising the one or more processors to:

validate, using a fifth ensemble of the plurality of ensembles responsive to executing the section detection module, a label for each of the sections by comparing the text of the respective sheet to the label of the respective section, the label for each of the sections assigned by the section detection module.

5. The system of claim 1, comprising the one or more processors to:

determine, responsive to executing the section detection module, that the sections comprise at least entities or tables.

6. The system of claim 1, wherein executing the section detection module comprises the one or more processors to:

identify, using the second ensemble, the sections of each sheet of the data set by performing object recognition on the images of each sheet; and assign, using the second ensemble, a label to each section of each sheet of the data set by parsing the text for an indication of the label.

7. The system of claim 1, wherein executing the section detection module comprises the one or more processors to:

determine, using a fifth machine learning ensemble of the plurality of ensembles, that one or more of the sections is an entity by identifying a paired pattern of the text of each section; and determine, using a sixth machine learning ensemble of the plurality of ensembles, that one or more of the sections is a table by parsing the text of each section.

8. The system of claim 1, wherein executing the page classification module comprises the one or more processors to:

identify, using the third ensemble, the classifications within each sheet based on the data set by parsing the text of each sheet of the data set for a relation to the classifications.

9. The system of claim 1, wherein the classifications comprise balances and totals.

10. The system of claim 1, comprising the one or more processors to parallelly execute the section detection module and the page classification module.

11. A method comprising:

receiving, by one or more processors coupled with memory, a data set comprising sheets in a first file type from a plurality of sources, the data set in one of a plurality of formats corresponding to one or more of the plurality of sources;

identifying, by the one or more processors, a plurality of ensembles, each ensemble of the plurality of ensembles comprising one or more machine learning models and each ensemble to determine an outcome based on an outcome of each machine learning model of each respective ensemble;

identifying, by the one or more processors using a first ensemble of the plurality of ensembles, a type for each sheet of the data set based on a vendor type and the data set;

executing, by the one or more processors using a second ensemble of the plurality of ensembles, a section detection module to identify sections for each sheet of the data set based on the respective type for each sheet and images and text within each sheet;

executing, by the one or more processors using a third ensemble of the plurality of ensembles, a page classification module to identify classifications within each sheet based on the data set;

generating, by the one or more processors, an association between the sections and the classifications for each type of each sheet of the data set;

transforming, by the one or more processors using a fourth ensemble of the plurality of ensembles based on the association, the sections, the classifications, and the type, the data set into a format of a second file type different from the plurality of formats; and provide, for rendering by a display device coupled with the one or more processors, the transformed data set for integration into a capital management system.

12. The method of claim 11, comprising:

receiving, by the one or more processors, a second data set comprising a first subset of data to be an input into the one or more machine learning models and a second subset of data to compare against an output of the one or more machine learning models;

generating, by the one or more processors using the first subset of data, the plurality of ensembles, each ensemble of the plurality of ensembles comprising a subset of the one or more machine learning models and each ensemble to be generated sequentially; and determining, by the one or more processors using the second subset of data, that each machine learning model of each ensemble of the plurality of ensembles is below a threshold error.

13. The method of claim 11, comprising:

determining, by the one or more processors, that an error of one or more ensembles of the plurality of ensembles is greater than or equal to a threshold error;

aggregating, by the one or more processors, a second data set comprising a first subset of data to be an input into the one or more machine learning models and a second subset of data to compare against an output of the one or more machine learning models;

generating, by the one or more processors using the first subset of data, a second plurality of ensembles for each ensemble of the plurality of ensembles with its error greater than or equal to the threshold error, each ensemble of the second plurality of ensembles comprising a subset of the one or more machine learning models;

determining, by the one or more processors using the second subset of data, that each machine learning model of each ensemble of the second plurality of ensembles is below the threshold error; and replacing, by the one or more processors, the plurality of ensembles with the second plurality of ensembles for each ensemble of the plurality of ensembles determined to have its error greater than or equal to the threshold error.

14. The method of claim 11, comprising:

validating, by the one or more processors using a fifth ensemble of the plurality of ensembles responsive to executing the section detection module, a label for each of the sections by comparing the text of the respective sheet to the label of the respective section, the label for each of the sections assigned by the section detection module.

15. The method of claim 11, wherein executing the section detection module comprises:

identifying, by the one or more processors using the second ensemble, the sections of each sheet of the data set by performing object recognition on the images of each sheet; and assigning, by the one or more processors using the second ensemble, a label to each section of each sheet of the data set by parsing the text for an indication of the label.

16. The method of claim 11, wherein executing the section detection module comprises:

determining, by the one or more processors using a fifth machine learning ensemble of the plurality of ensembles, that one or more of the sections is an entity by identifying a paired pattern of the text of each section; and determining, by the one or more processors using a sixth machine learning ensemble of the plurality of ensembles, that one or more of the sections is a table by parsing the text of each section.

17. The method of claim 11, wherein executing the page classification module comprises:

identifying, by the one or more processors using the third ensemble, the classifications within each sheet based on the data set by parsing the text of each sheet of the data set for a relation to the classifications.

18. The method of claim 11, comprising:

executing, by the one or more processors, the section detection module and the sheet classification module in parallel.

19. A non-transitory computer-readable medium, executing instructions embodied thereon, the instructions to cause one or more processors to:

receive a data set comprising sheets in a first file type from a plurality of sources, the data set in one of a plurality of formats corresponding to one or more of the plurality of sources;

identify a plurality of ensembles, each ensemble of the plurality of ensembles comprising one or more machine learning models and each ensemble to determine an outcome based on an outcome of each machine learning model of each respective ensemble;

identify, using a first ensemble of the plurality of ensembles, a type for each sheet of the data set based on a vendor type and the data set;

execute, using a second ensemble of the plurality of ensembles, a section detection module to identify sections for each sheet of the data set based on the respective type for each sheet and images and text within each sheet;

execute, using a third ensemble of the plurality of ensembles, a page classification module to identify classifications within each sheet based on the data set;

generate an association between the sections and the classifications for each type of each sheet of the data set;

transform, using a fourth ensemble of the plurality of ensembles based on the association, the sections, the classifications, and the type, the data set into a format of a second file type different from the plurality of formats; and provide, for render by a display device coupled with the one or more processors, the transformed data set for integration into an electronic transaction system.

20. The non-transitory computer-readable medium of claim 19, comprising the instructions to cause the one or more processors to:

validate, using a fifth ensemble of the plurality of ensembles responsive to executing the section detection module, a label for each of the sections by comparing the text of the respective sheet to the label of the respective section, the label for each of the sections assigned by the section detection module.

* * * * *